United States Patent
Chan et al.

(10) Patent No.: US 10,146,838 B2
(45) Date of Patent: Dec. 4, 2018

(54) CONTEXTUAL MANAGEMENT OF CLIENT DEVICES

(71) Applicant: AT&T Intellectual Property I, L.P., Atlanta, GA (US)

(72) Inventors: Jesse Chan, Bothell, WA (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 401 days.

(21) Appl. No.: 14/501,254

(22) Filed: Sep. 30, 2014

(65) Prior Publication Data

US 2016/0092600 A1   Mar. 31, 2016

(51) Int. Cl.
*G06F 7/00* (2006.01)
*G06F 17/30* (2006.01)

(52) U.S. Cl.
CPC .. *G06F 17/30528* (2013.01); *G06F 17/30082* (2013.01); *G06F 17/30507* (2013.01)

(58) Field of Classification Search
CPC ......... G06F 17/30867; G06F 17/30477; G06F 17/30528; G06F 17/30424; G06F 17/30554
USPC ....................................................... 707/769
See application file for complete search history.

(56) References Cited

U.S. PATENT DOCUMENTS

| | | | |
|---|---|---|---|
| 6,115,755 A | 9/2000 | Krishan | |
| 6,518,724 B2 | 2/2003 | Janik | |
| 7,009,946 B1 | 3/2006 | Kardach | |
| 7,668,106 B2 | 2/2010 | Ito et al. | |
| 8,024,503 B2 | 9/2011 | Zhang | |
| 8,261,345 B2 | 9/2012 | Hitomi et al. | |
| 8,463,872 B2 | 6/2013 | Pounds et al. | |
| 8,553,882 B2 | 10/2013 | Cholas et al. | |
| 8,591,264 B2 | 11/2013 | Binder | |
| 8,707,308 B1 * | 4/2014 | Naamad | G06F 12/0862 718/100 |
| 8,724,639 B2 | 5/2014 | Mahmoud | |
| 8,782,121 B1 * | 7/2014 | Chang | H04L 67/104 709/202 |
| 8,782,122 B1 * | 7/2014 | Chang | H04L 67/1048 709/202 |

(Continued)

FOREIGN PATENT DOCUMENTS

CN  1601993 A  3/2005
CN  201312348 Y  9/2009

(Continued)

OTHER PUBLICATIONS

Hjorthol et al., "Home as a communication hub: the domestic use of ICT" www.sciencedirect.com, Journal of Transport Geography, vol. 17, Issue 2, Mar. 2009, 2 pages.

(Continued)

*Primary Examiner* — Hosain Alam
*Assistant Examiner* — Nicholas Allen
(74) *Attorney, Agent, or Firm* — Hartman & Citrin LLC

(57) ABSTRACT

Centralized contextual awareness is used to resolve conflicts. When two or more client devices interact, a current context of each client device is evaluated for rule-based decisions. Conflicts in rules may be arbitrated based on policies and goals to generate a resolution.

18 Claims, 25 Drawing Sheets

(56) References Cited

U.S. PATENT DOCUMENTS

| | | | | |
|---|---|---|---|---|
| 2006/0265259 | A1* | 11/2006 | Diana | G06Q 30/08 705/35 |
| 2007/0217436 | A1 | 9/2007 | Markley et al. | |
| 2008/0091682 | A1* | 4/2008 | Lim | G06F 17/3089 |
| 2009/0138960 | A1* | 5/2009 | Felty | H04L 63/0263 726/14 |
| 2010/0036779 | A1* | 2/2010 | Sadeh-Koniecpol | H04L 63/20 706/11 |
| 2010/0106852 | A1* | 4/2010 | Kindig | G06F 17/30035 709/231 |
| 2010/0289643 | A1* | 11/2010 | Trundle | F24F 11/0086 340/545.1 |
| 2010/0293543 | A1* | 11/2010 | Erhart | H04W 8/18 718/1 |
| 2012/0084666 | A1* | 4/2012 | Hickman | G06Q 30/02 715/751 |
| 2012/0166642 | A1* | 6/2012 | Saint Clair | H04L 67/125 709/225 |
| 2012/0320761 | A1 | 12/2012 | Taylor et al. | |
| 2013/0091279 | A1 | 4/2013 | Haddad et al. | |
| 2013/0176127 | A1* | 7/2013 | Junqua | G06F 17/30292 340/573.1 |
| 2013/0204825 | A1 | 8/2013 | Su | |
| 2013/0205329 | A1 | 8/2013 | Markley et al. | |
| 2013/0212065 | A1* | 8/2013 | Rahnama | G06F 17/30002 707/609 |
| 2013/0268129 | A1* | 10/2013 | Fadell | G06Q 10/20 700/278 |
| 2013/0285855 | A1* | 10/2013 | Dupray | G01S 19/48 342/451 |
| 2013/0311667 | A1* | 11/2013 | Payette | H04L 67/14 709/228 |
| 2013/0312117 | A1* | 11/2013 | Sapp, II | G06F 21/62 726/30 |
| 2013/0316746 | A1 | 11/2013 | Miller et al. | |
| 2013/0339498 | A1* | 12/2013 | Johnson | H04W 4/02 709/221 |
| 2013/0344859 | A1* | 12/2013 | Abramson | G06Q 50/265 455/418 |
| 2014/0089243 | A1* | 3/2014 | Oppenheimer | G06F 21/50 706/46 |
| 2014/0113653 | A1* | 4/2014 | Wendling | H04L 41/0893 455/456.1 |
| 2014/0122396 | A1* | 5/2014 | Swaminathan | G06N 99/005 706/14 |
| 2014/0164611 | A1* | 6/2014 | Molettiere | A61B 5/6838 709/224 |
| 2014/0180595 | A1* | 6/2014 | Brumback | A61B 5/0015 702/19 |
| 2014/0195664 | A1* | 7/2014 | Rahnama | G06F 17/30528 709/223 |
| 2014/0201145 | A1* | 7/2014 | Dorman | G06F 17/30575 707/634 |

FOREIGN PATENT DOCUMENTS

| | | |
|---|---|---|
| WO | WO 2001056297 A1 | 8/2001 |
| WO | WO 2006083958 A2 | 8/2006 |

OTHER PUBLICATIONS

Anderson et al., "Family Life in the Digital Home—Domestic Telecommunications at the End of the 20th Century", BT Technology Journal, Jan. 1999, vol. 17, Issue 1, pp. 85-97.

Vendkatesh et al., "The networked home: an analysis of current developments and future trends", link.springer.com, Cognition, Technology & Work, Apr. 2003, vol. 5, Issue 1, pp. 23-32.

Newton, Thomas, "Virgin Media launches new dual band Super Hub, the 'UK's fastest wireless router'", recombu.com, May 31, 2013, 11 pages.

Unknown, "How to Create an Entertainment Hub in Your Home", Cool Things, Jun. 27, 2013, 6 pages.

\* cited by examiner

CONTEXTUAL MANAGEMENT OF CLIENT DEVICES

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Mobile communications have revolutionized our lives. Mobile access to the Internet has put massive amounts of information at our fingertips, at all hours of the day. However, as mobile devices continue to proliferate, interactions may be intrusive and cumbersome. Contextual awareness provides an arbitration mechanism for these device interactions.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
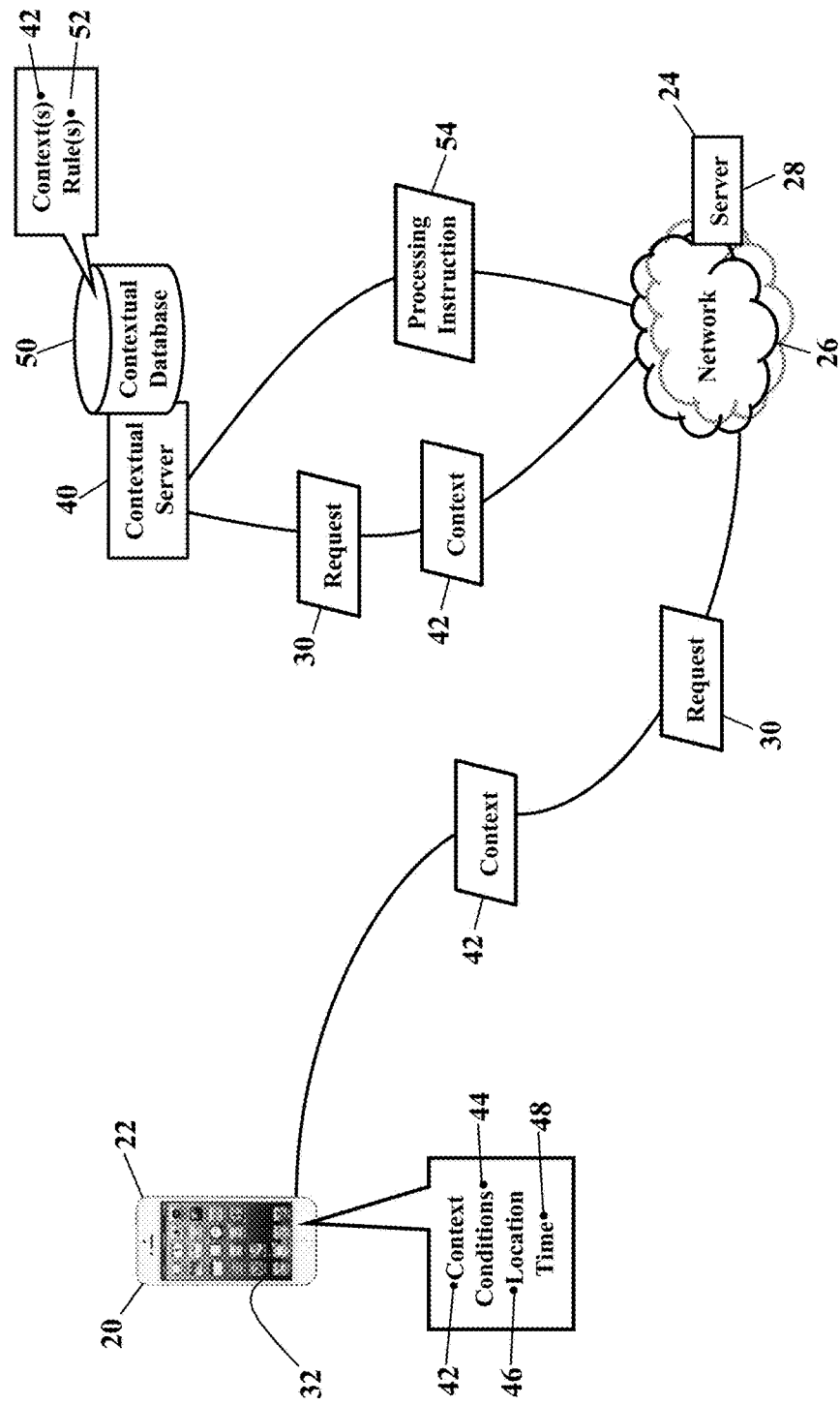
FIGS. 1-8 are simplified schematics illustrating an environment in which exemplary embodiments may be implemented.

FIGS. 1-8 are simplified schematics illustrating an environment in which exemplary embodiments may be implemented. FIG. 1 illustrates centralized, contextual management of a client. The client is illustrated as a client device 20, such as a mobile smartphone 22. The client, however, may be any device, application, or service (as later paragraphs will explain). Whatever the client, exemplary embodiments manage the client based on its context. That is, whenever the client device 20 interacts with a network element 24 (using any communications network 26), rules and/or policies may be implemented, based on context. For example, if the network element 24 is a server 28, the client may make some transactional request 30. Conventionally the network element 24 would perform the requested transaction and send a response to the network address assigned to the client device 20. The client device 20 would then process the response (such as displaying content on a display device 32).

Here, though, a contextual server 40 may intervene. When the network element 24 receives the transactional request 30 from the client device 20, the network element 24 may suspend processing and query the contextual server 40 for instructions. That is, before responding to the transactional request 30, the network element 24 may query the contextual server 40 for rules and/or policies that govern the operation of the client device 20. The network element 24, in other words, may first check for special processing instructions related to the client device 20.

Registration may be used. As the reader may understand, users often register themselves and/or their devices for applications and services. When the network element 24 checks for special processing instructions related to the client device 20, the network element 24 may query a registration database. The registration database stores identifiers of users and devices that qualify for different applications and services. Whenever the client device 20 makes some transaction, exemplary embodiments may check whether the user or the client device 20 is registered for an application or service.

Exemplary embodiments may use context 42. As those of ordinary skill understand, as the mobile smartphone 22 is carried and used throughout the day, various conditions 44 change. For example, as the smartphone 22 is carried and used, a location 46 and a time 48 of that usage change. There may also be many other conditions 44, as later paragraphs will explain. Whatever conditions 44 are used, the conditions 44 are evaluated to determine the current context 42 of the client device 20. The current context 42 may then be sent to the contextual server 40 for analysis and use.

The contextual server 40 obtains the current context 42 of the client device 20. Once the current context 42 is determined, the contextual server 40 consults a contextual database 50. The contextual database 50 stores different rules 52 associated with different contexts 42. The contextual server 40 thus retrieves one or more rules 52 that correspond to the current context 42 of the client device 20. The contextual server 40 may then send the rule(s) 52 to the network element 24 for evaluation and enforcement. FIG. 1, however, also illustrates centralized enforcement, where the contextual server 40 also compares the transactional request 30 to the rules 52 that govern the current context 42 of the client device 20. If the transactional request 30 satisfies the rule(s) 52, then the network element 24 may be permitted to resume processing of the transactional request 30 (such as by processing instruction 54). Should, however, the transactional request 30 fail the rule(s) 52, the contextual server 40 may instruct the network element 24 to deny the transactional request 30. The contextual server 40 thus acts as a centralized, network-centric resource for enforcing the contextual rules 52 defined for the client device 20.

Figure 2:
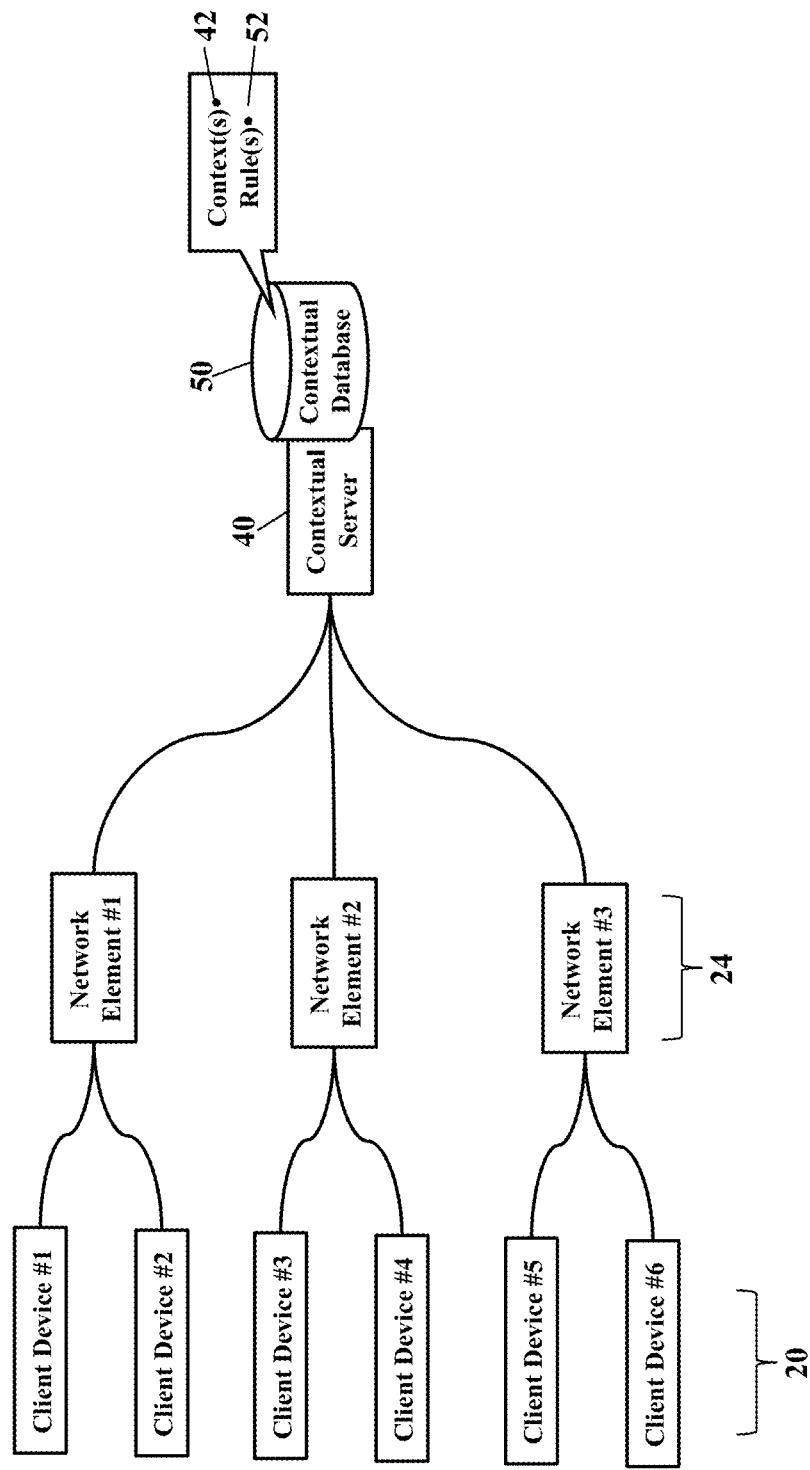

FIG. 2 further illustrates the contextual database 50. Here the contextual database 50 may store contextual rules 52 for many different client devices 20. Because the contextual server 40 may be a centralized resource, the contextual server 40 may provide rule-based applications and services for any network. Whenever any network element 24 interacts with any client device 20, the network element 24 may query the contextual server 40 for the rules 52 associated with the current context 42 of the respective client device 20. The contextual server 40 may then send the contextual rule(s) 52 to the network element 24 for evaluation and enforcement, or the contextual server 40 may itself enforce the rules 52. Regardless, the contextual server 40 may maintain contextual rules 52 for a population of client devices, whether tens, hundreds, or thousands. The rules 52 may be obtained from any source, such as a government entity or a manufacturer of the client device 20, as later paragraphs explain. Even the user of the client device 20 may define the rules 52, as later paragraphs will also explain.

Figure 3:
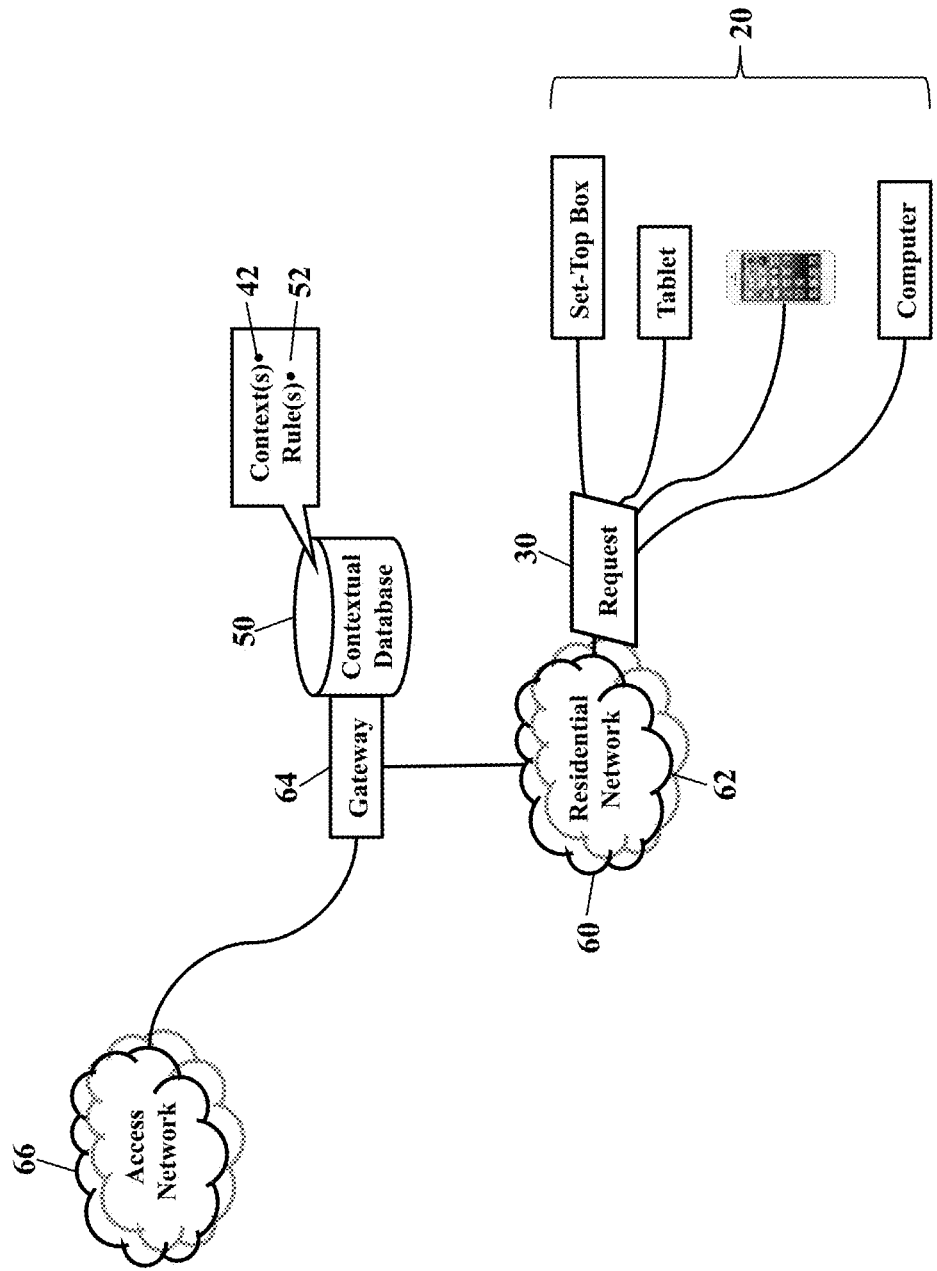

FIG. 3 illustrates a more local management scheme. Here the contextual database 50 may be maintained within, or provide management services to, a local area network 60. The local area network 60 is illustrated a residential network 62 having a gateway 64 to an access network 66. The gateway 64 provides network services for the client devices 20 in the residential network 62. Many homes, for example, have a wired and/or wireless network of set-top boxes, printers, computers, tablets, and other devices. Here, though, the contextual database 50 may define the contextual rules 52 for the client devices 20 in the residential network 62. For simplicity, FIG. 3 illustrates the contextual database 50 locally stored within the gateway 64 to the access network 66. The contextual database 50, however, may be locally stored within any element in the residential network 62. Regardless, the contextual database 50 may provide rule-based services for any of the client devices 20. Whenever any client device 20 makes the transactional request 30 within the residential network 62, the contextual database 50 may be queried for the corresponding contextual rules 52. The contextual rules 52 may then be evaluated and enforced to ensure the user's contextual preferences are satisfied.

Figure 4:
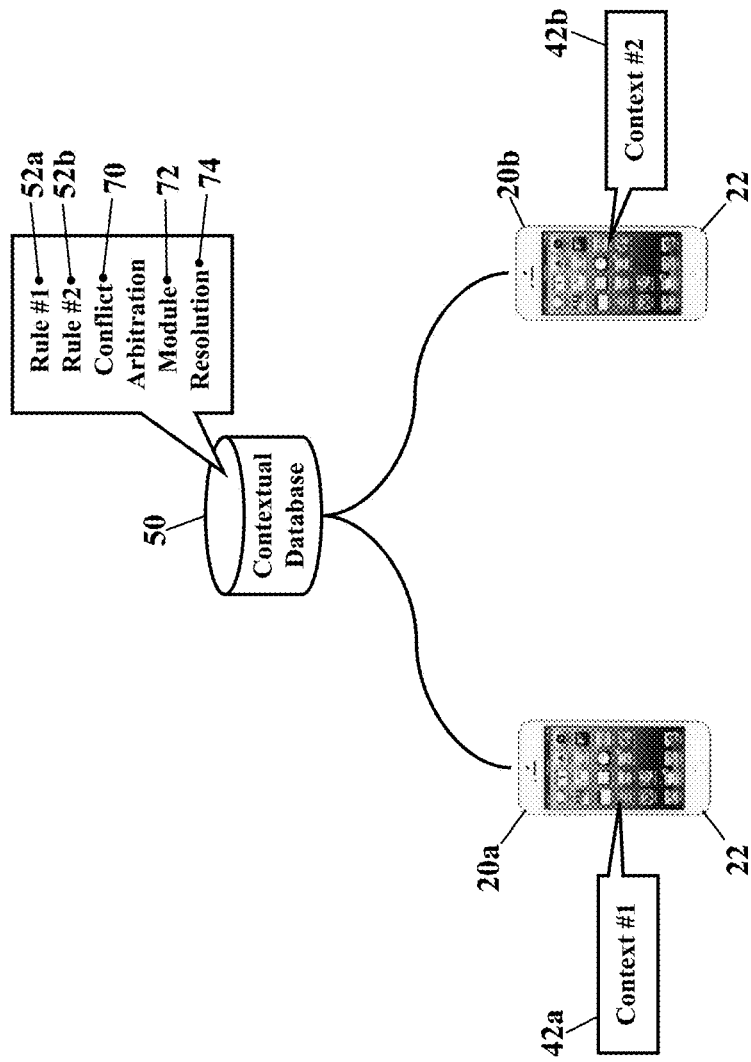

FIG. 4 illustrates arbitration. Whether the contextual database 50 operates in the local area network (illustrated in FIG. 3) or in a wide-area network (illustrated in FIG. 1), client interactions are inevitable. As the reader may foretell, there will be many instances when two different client devices 20 attempt to interact with each other. Members of the same household, for example, will often interact using their respective smartphones 22. Coworkers will also often interact using their respective client devices 20. Whatever the interaction, there will be times when conflicts arise. That is, two or more client devices 20 may conduct any transaction, but their respective contextual rules 52 will conflict. Exemplary embodiments, then, may arbitrate between the conflicting contextual rules 52. FIG. 4, for example, illustrates a first contextual rule 52*a* (associated with a first context 42*a* of a first client device 20*a*) and a second contextual rule 52*b* (associated with a second context 42*b* of a second client device 20*b*). When the first contextual rule 52*a* is compared to the second contextual rule 52*b*, a conflict 70 may exist. The contextual server 40 may thus access and execute an arbitration module 72 to determine a resolution 74 of the conflict 70. So, when two or more client devices 20 desire any interaction, exemplary embodiments may govern the interactions between different client devices 20.

Figure 5:
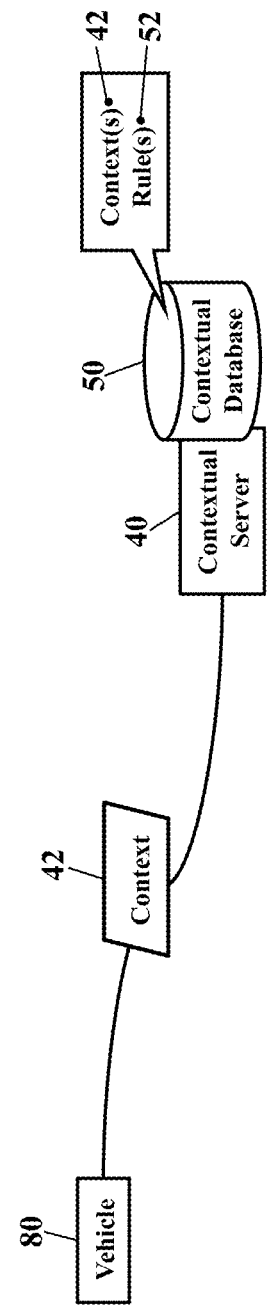
Figure 6:
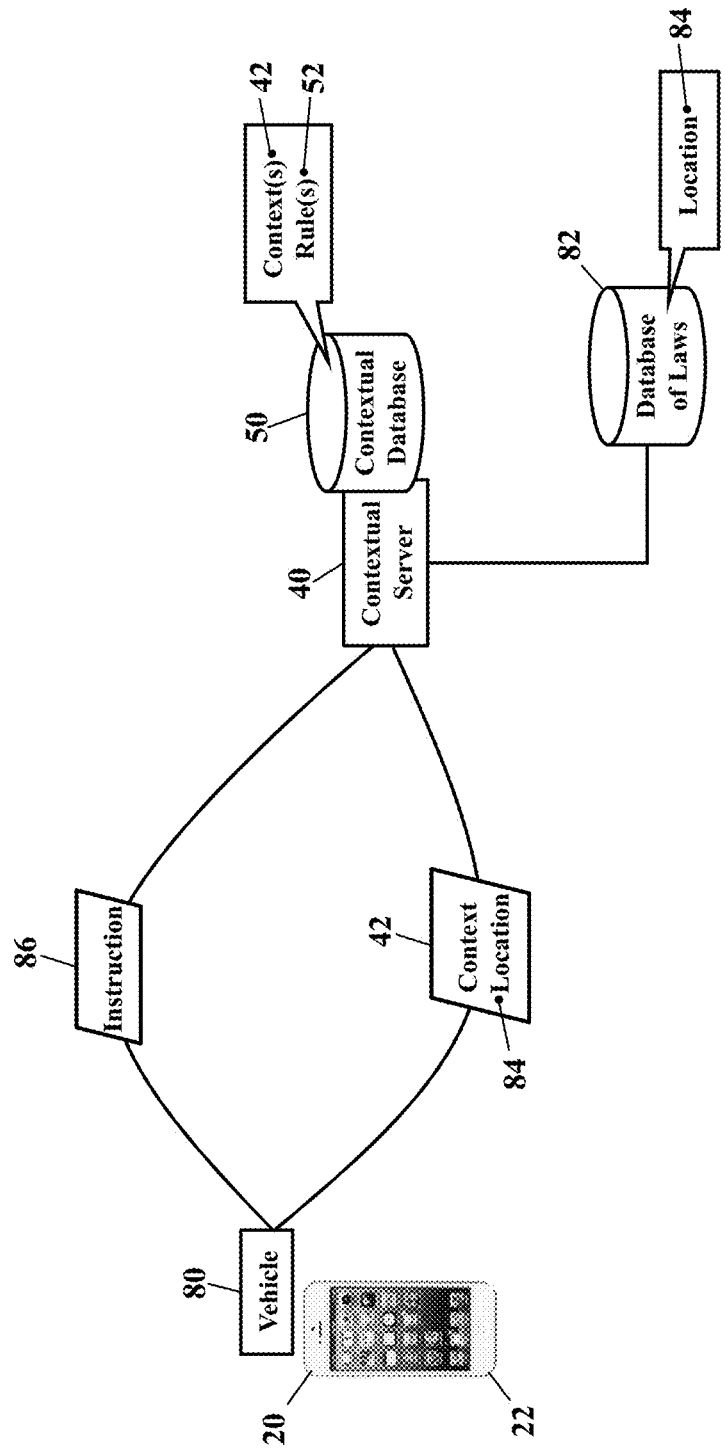

FIGS. 5-6 provide an example. Here the client device 20 is illustrated as a vehicle 80 that interacts with the contextual server 40. As the reader may understand, many cars and trucks have a network interface that permits wireless communication over a communications network 26. As the vehicle 80 travels, the vehicle 80 sends its current context 42 (e.g., speed, time, and location) to the contextual server 40. The contextual server 40 retrieves and enforces the contextual rules 52 associated with the current context 42 of the vehicle 80. Suppose, for example, that the contextual rules 52 define maximum speeds for different roads. If the vehicle 80 travels seventy-five miles per hour (75 MPH) in a 55 MPH zone, the contextual server 40 may enforce the speed limit. Indeed, FIG. 6 illustrates a database 82 of laws that may be queried for different geographical locations 84. The database 82 of laws is a compilation of laws, regulations, zoning, construction, and ordinances arranged according to different geographical locations. The database 82 of laws, however, may also include entries for the locations of traffic lights, crosswalks, bike-only lanes, and any other traffic feature. The database 82 of laws, for example, may include information describing the locations where right turns on red light are permitted or not permitted. The database 82 of laws may also describe locations of roadway construction and the corresponding speed limits. The database 82 of laws may also describe where pedestrians have the right of way and where left turns are not permitted. The database 82 of laws, in short, may be an extensive compilation of local regulations. Regardless, once the vehicle's location 84 is known, the contextual server 40 may query the database 82 of laws for the corresponding traffic regulations, local governmental laws, and any other operational restrictions that are expressed as the logical rules 52. For example, the contextual server 40 may retrieve local ordinances prohibiting text messaging while driving, prohibiting right turns on red, and requiring headlights during rain. Whatever the rules 52 governing motor vehicle operation, the contextual server 40 may generate an enforcement instruction 86 that is sent to the network address associated with the vehicle 80. The enforcement instruction 86 may cause the vehicle 80 to audibly present or display a warning of improper/illegal behavior. The enforcement instruction 86 may also be sent to other connected, interacting client devices 20, such as the driver's BLUETOOTH® smartphone 22. The enforcement instruction 86 may even disable SMS/MMS text messaging for the driver's smartphone 22. The enforcement instruction 86 may also automatically cause the vehicle 80 and/or the driver's smartphone 22 to activate features or functions, such as turning on the headlights when the wipers are operating. Later paragraphs will describe many more examples of the contextual rules 52.

Other examples are quickly provided. When the conflict 70 is determined, one of the users may be designated as the resolver. That is, one of the users may have permission or authority to view the conflict 70 and determine or approve the resolution 74. The resolver, for example, may modify one or more of the contextual rules 52 to resolve the conflict 70. Any conflicting rule 52 may be manually overridden or disabled, such as in an emergency situation. The resolver may also request/approve a one-time exception, or even a long-term change in policy, so avoid the conflict 70.

A common, everyday example helps explain conflict resolution. Suppose a husband defines his contextual rule 52 that the outdoor lights should activate when his connected vehicle 80 is within 300 feet of home. The wife's rule 52, however, prohibits the outdoor lights between 11 PM and 5 AM. If the husband's vehicle arrives home at 1 AM, the conflict 70 exists. Both the husband's rule 52 and the wife's rule 52 cannot be mutually executed. Exemplary embodiments thus execute the arbitration module 72 to determine the resolution 74 of the conflict 70. In this example, then, the arbitration module 72 may rely on a policy or social goal to determine the resolution. If personal safety is the overarching policy, exemplary embodiments may activate the outdoor lights to ensure the husband's safety. Exemplary embodiments may, after a few minutes, then deactivate the outdoor lights in keeping with the wife's rule 52.

Figure 7:
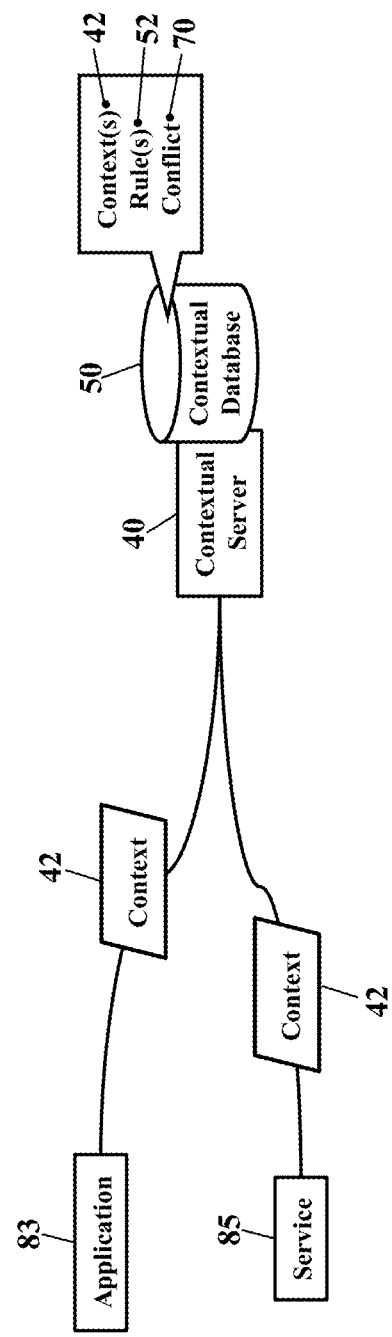

FIG. 7 further illustrates the client. Contextual management may be utilized by any software application 83 or service 85 based on the context 42. That is, whenever any client desires contextual management, the client need only query the contextual server 40. FIG. 7 thus illustrates the software application 83 or service 85 sending the context 42 to the contextual server 40. The contextual server 40 consults the contextual database 50 for the corresponding rule 52. The rule 52 may then be returned to the software application 83 or service 85, or the rule 52 may be implemented on behalf of the software application 83 or service 85. Regardless, exemplary embodiments may be provided to any client, whether device, application, or service.

Exemplary embodiments improve cohesiveness of the contextual rules 52. Conventional schemes utilize operational rules that are independently siloed and device specific. That is, conventional schemes only provide integrated interaction. In fact, because conventional schemes are device specific, conflicting scenarios often arise when devices operate in a network ecosystem. Exemplary embodiments, instead, define and enforce the contextual rules 52 across any variety of connected client devices 20. Diverse client devices 20 may thus use contextual awareness for improved integration and user experience.

Exemplary embodiments thus centralize management of a user's interactions. Even though disparate Internet client devices 20 may interact, exemplary embodiments expand the capabilities on any one individual device. Centralized, contextual management provides an ecosystem where diverse client devices 20 may interact and provide additional capabilities beyond what any single device may independently provide. Indeed, exemplary embodiments may simplify the functions of the client device 20 by removing or reducing the overlapping memory, processing, and software devoted to rules management. Instead, exemplary embodiments delegate rules management to a central service or device (such as the contextual server 40 or the gateway 64), thus greatly reducing time and cost of creating Internet connected clients. The client devices 20, in other words, are relieved of rules management duties, such as changing the rules 52, identifying the conflict 70, and determining the resolution 74.

Exemplary embodiments also simplify laws compliance. As the proliferation of Internet connected clients continues to grow, exemplary embodiments provide a simple communication mechanism between users and lawmakers. This communication would often occur when a new context 42, likely unforeseen, led to the conflict 70 with one or more laws and policies. Here, though, exemplary embodiments quickly identify the conflict 70 and generate the resolution 74, thus quickly and ultimately benefitting society. Individual users are thus quickly apprised of policies, legislation, and laws for determining how Internet connected clients should interact in different contexts and scenarios. Further, client devices 20 benefit from up-to-date from data feeds, ensuring changes to laws and policies are relayed to any user's client device 20.

Exemplary embodiments also provide override situations. Whatever the rule 52, there will be times when strict adherence is not desired. For example, there may health or safety issue for which suspension of the rule 52 is desired or warranted. Exemplary embodiments, then, may permit the user of the client device 20 to automatically request, or to manually override, the rule 52. The user of the client device 20 may thus select some graphical control in a user interface to suspend or stop enforcement of the rule 52. The contextual server 40 may also autonomously suspend or stop enforcement of the rule 52, based on an inference or indication of an emergency situation. For example, when the conflict 70 is determined, the contextual server 40 may prompt the user of the client device 20 to manually declare an emergency situation, for which enforcement halts.

Figure 8:
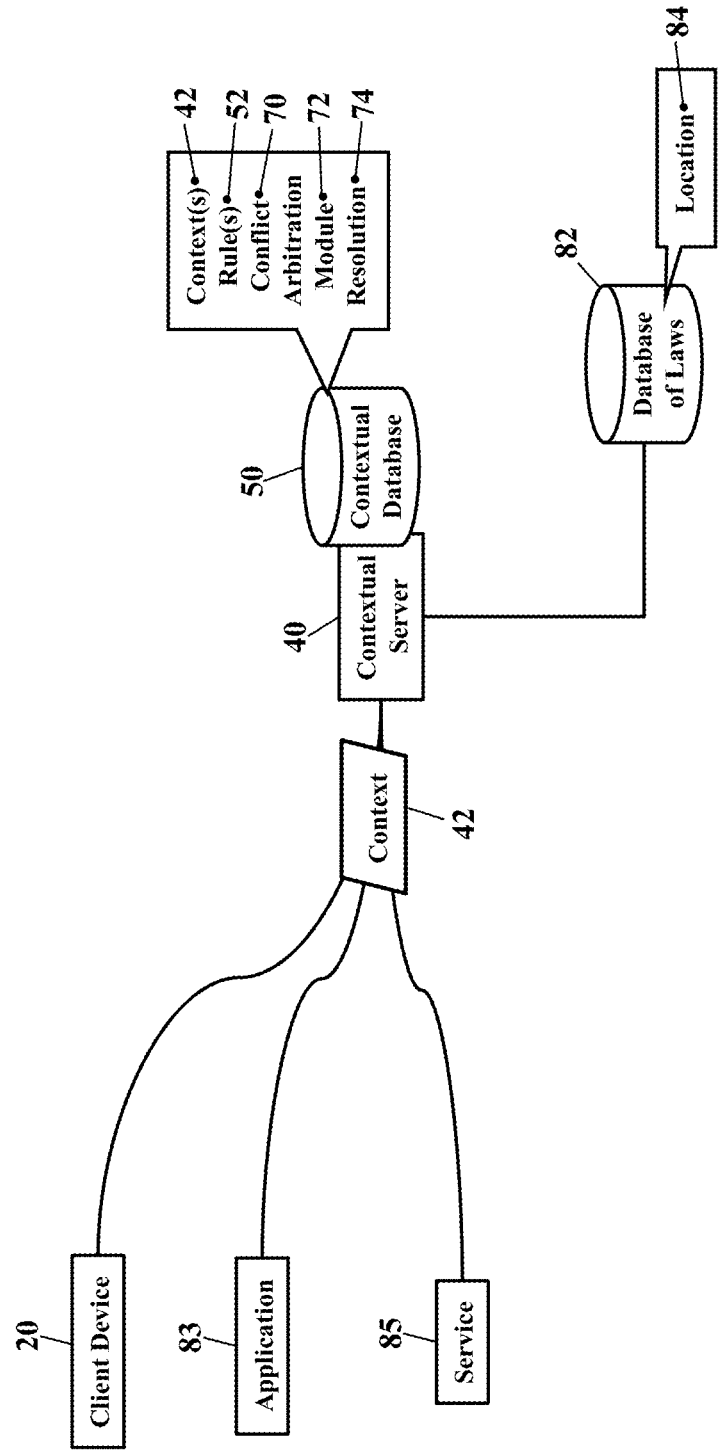

FIG. 8 illustrates group registration. As the client may be any device 20, application 83, and service 85, exemplary embodiments may be applied to a single user or to a group of users. That is, exemplary embodiments may be based on registration according to user or user group. Consider, for example, a household family having individual devices. Each family user may also subscribe to different applications and services. Indeed, it is common for users to register with lists of clients, such as banking applications, messaging applications, news feeds, and shopping clients. Some may register as an individual account, while others may register as a group account. The rules 52, then, may be defined for groups of users, based on their collective context 42 and their location 84. Once the group's location 84 is determined, the appropriate laws may be retrieved and applied to resolve the conflict 70 between competing rules 52. Some users may even be notified of the conflict 70 (such as a parent administrator), thus permitting the parent to resolve the conflict 70. Alternatively, the arbitration module 72 may automatically determine the resolution 74.

Figure 9:
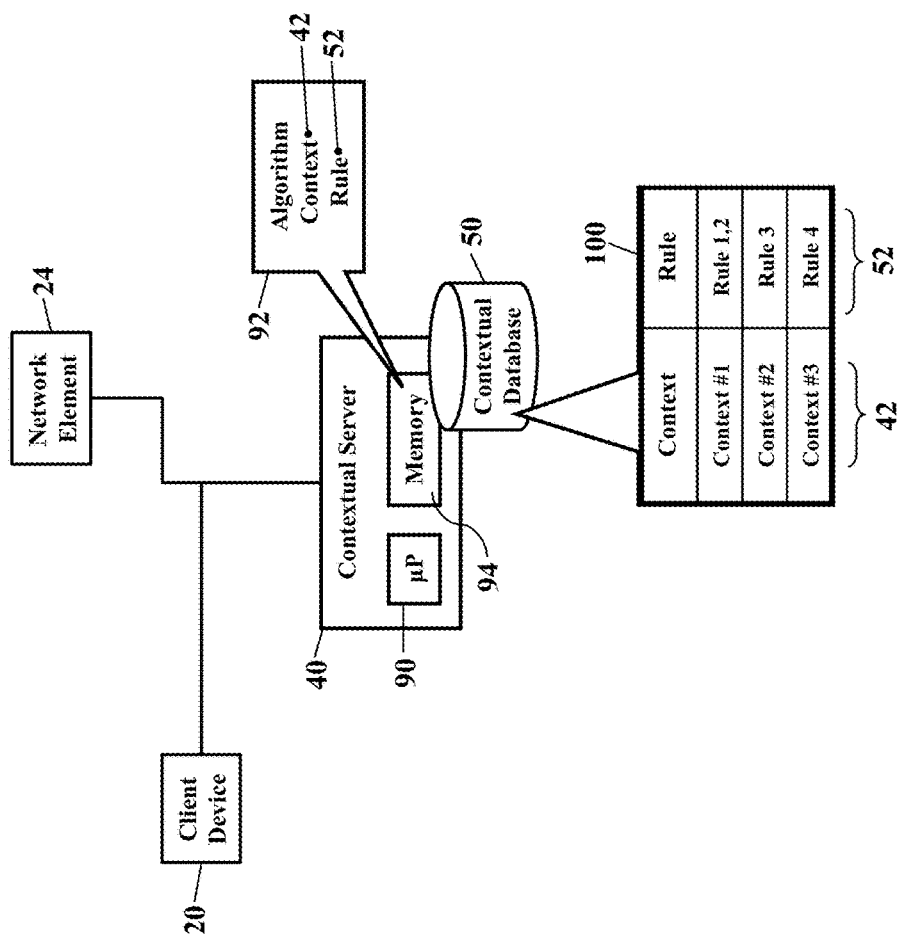
FIG. 9 is a more detailed block diagram illustrating a contextual server, according to exemplary embodiments.

FIG. 9 is a more detailed block diagram illustrating the contextual server 40, according to exemplary embodiments. The contextual server 40 obtains the current context 42 associated with the client device 20. The contextual server 40 then consults the contextual database 50 for the corresponding contextual rule(s) 52. The contextual server 40, for example, has a processor 90 (e.g., "μP"), application specific integrated circuit (ASIC), or other component that executes an algorithm 92 stored in a local memory 94. The algorithm 92 instructs the processor 90 to perform operations, such as querying the contextual database 50. FIG. 9 illustrates the contextual database 50 as a table 100 that maps, relates, or associates different contexts 42 to different rules 52. The contextual database 50 may thus be populated with entries for many different operational contexts 42 of the client device 20. While FIG. 9 only illustrates a few entries, in practice the contextual database 50 may contain as many entries as a user wishes to define. There may thus be many different contextual rules 52, depending on how the contexts 42 are categorized, valued, or delineated. Once the contextual server 40 obtains the current context 42 of the client device 20, the algorithm 92 instructs the processor 90 to retrieve the corresponding rule(s) 52. That is, if the current context 42 of the client device 20 matches one of the entries in the contextual database 50, the algorithm 92 may retrieve the corresponding rule(s) 52. The contextual server 40 may send the rule(s) 52 back to the client device 20 for enforcement and/or to the network element 24 for enforcement. However, the contextual server 40 may also enforce the rules 52, as this disclosure explains.

Exemplary embodiments may be applied regardless of networking environment. Exemplary embodiments may be easily adapted to mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. The processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 10:
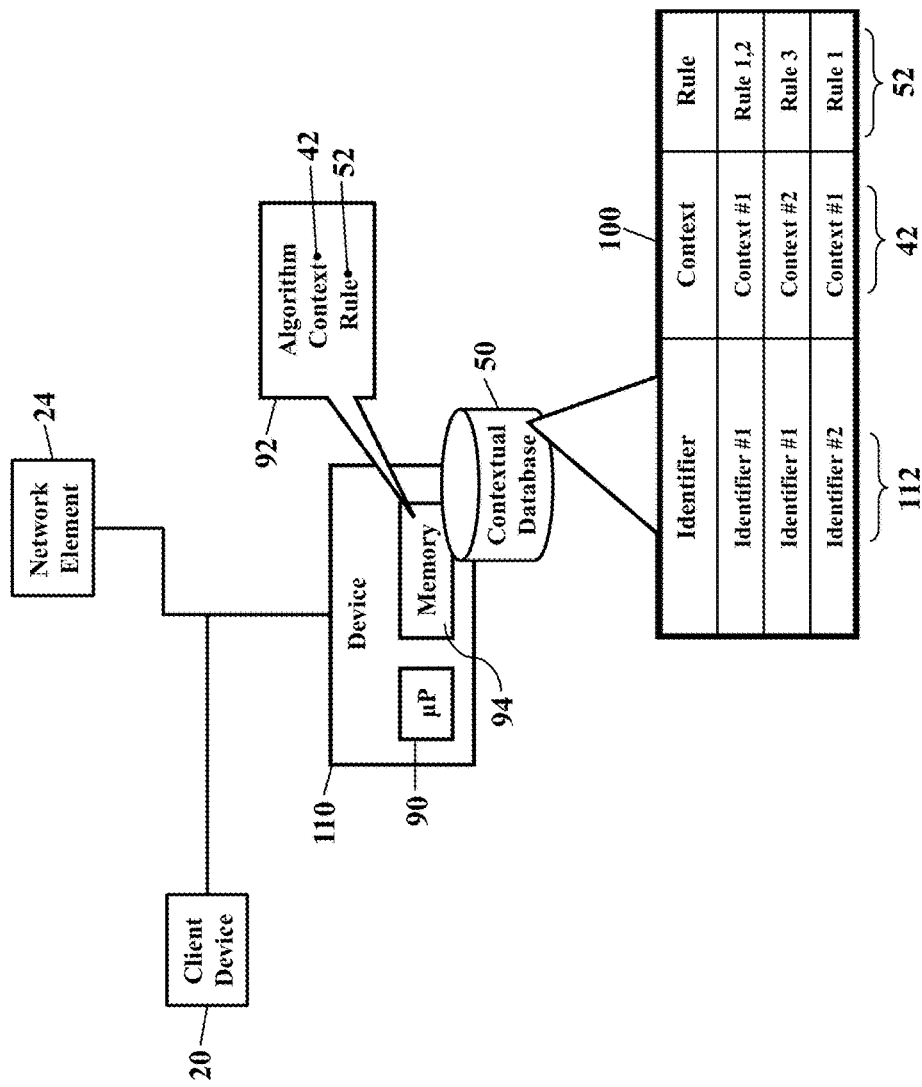
FIG. 10 is a more detailed illustration of a contextual database, according to exemplary embodiments.

FIG. 10 is a more detailed illustration of the contextual database 50, according to exemplary embodiments. The contextual database 50 may be stored and maintained within any processor-controlled device 110 that manages the contextual rules 52 for the client devices 20. Because the contextual database 50 may contextually manage many different client devices 20, the entries may be arranged according to the client device 20. For example, the contextual rules 52 may be arranged or associated by device identifier 112. As the reader may understand, each client device 20 may be uniquely identified by a different device identifier 112. Each device identifier 112 may be any alphanumeric arrangement that uniquely identifies the corresponding client device 20, such as an Internet Protocol address, serial number, and/or a machine moniker (e.g., "Bob's tablet"). Once the contextual server 40 receives the device identifier 112 of the client device 20, the processor 90 may query the contextual database 50 for the same device identifier 112 and its current context 42. The processor 90 thus retrieves the contextual rules 52 associated with the matching entries. The contextual server 40 may then enforce the contextual rules 52 and/or return send the rules 52 to a requesting device (such as the network element 24).

Figure 11:
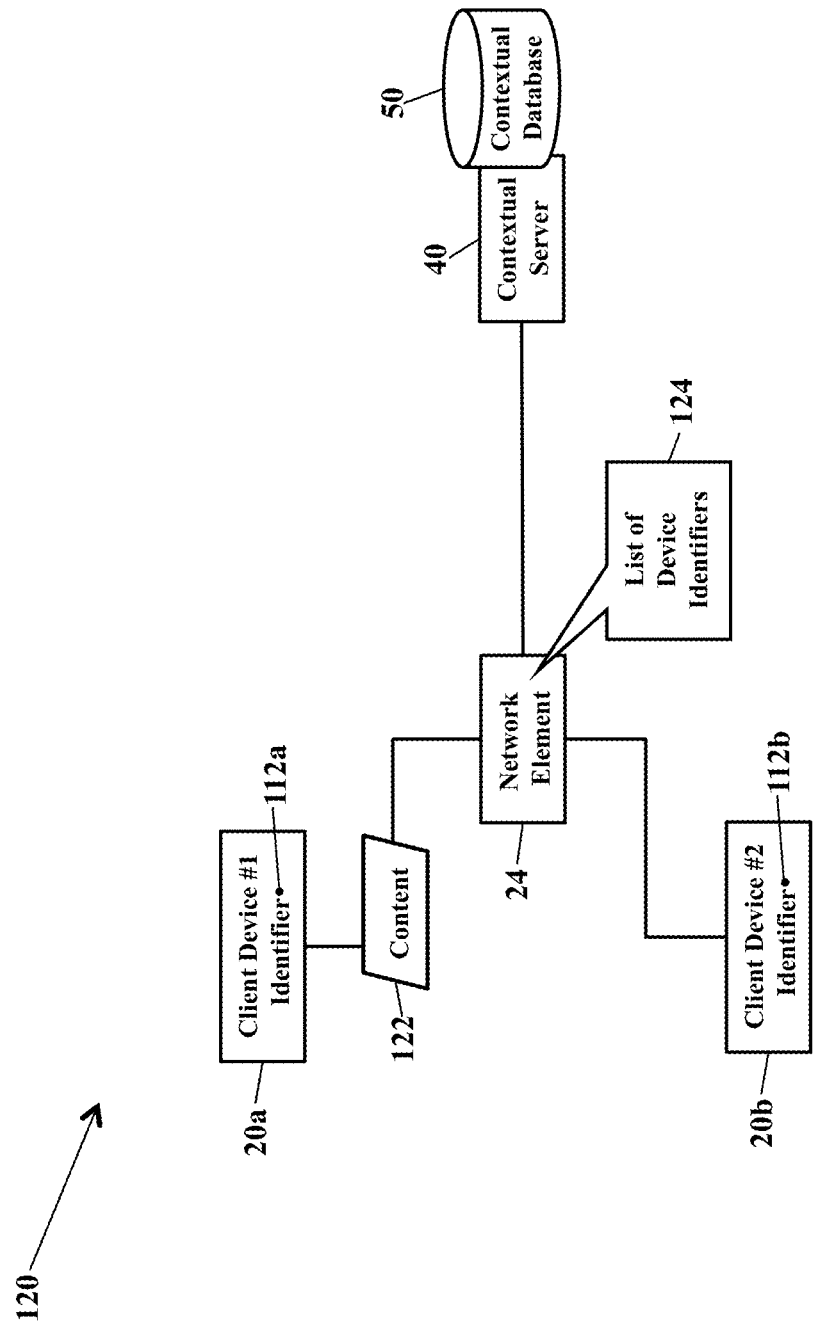
FIGS. 11-14 are detailed illustrations of contextual management, according to exemplary embodiments.

FIGS. 11-14 are detailed illustrations of contextual management 120, according to exemplary embodiments. When any client device 20 interacts with another client device 20, and/or with the generic network element 24, contextual management 120 may be required. FIG. 11, for example, illustrates a simple example of the first client device 20a attempting to share some content 122 (such as a digital photo) with the second client device 20b. There are many known transactional schemes for communication between the client devices 20a and 20b, so the details need not be explained. For the purposes of this disclosure, though, at some point the network element 24 obtains the corresponding device identifies 112a and 112b. The device identifiers 112a and 112b may be the respective Internet Protocol addresses in the IPv4/6 addressing scheme. Regardless, the network element 24 may suspend processing and check whether contextual management 120 is required. For example, the network element 24 may query a list 124 of device identifiers for which contextual management 120 is required. If either of the device identifiers 112a or 112b is matched to the list 124 of device identifiers, then contextual management 120 is required. If neither device identifier 112a nor 112b matches the list 124 of device identifiers, then contextual management 120 may not be required and conventional processing may resume.

Figure 12:
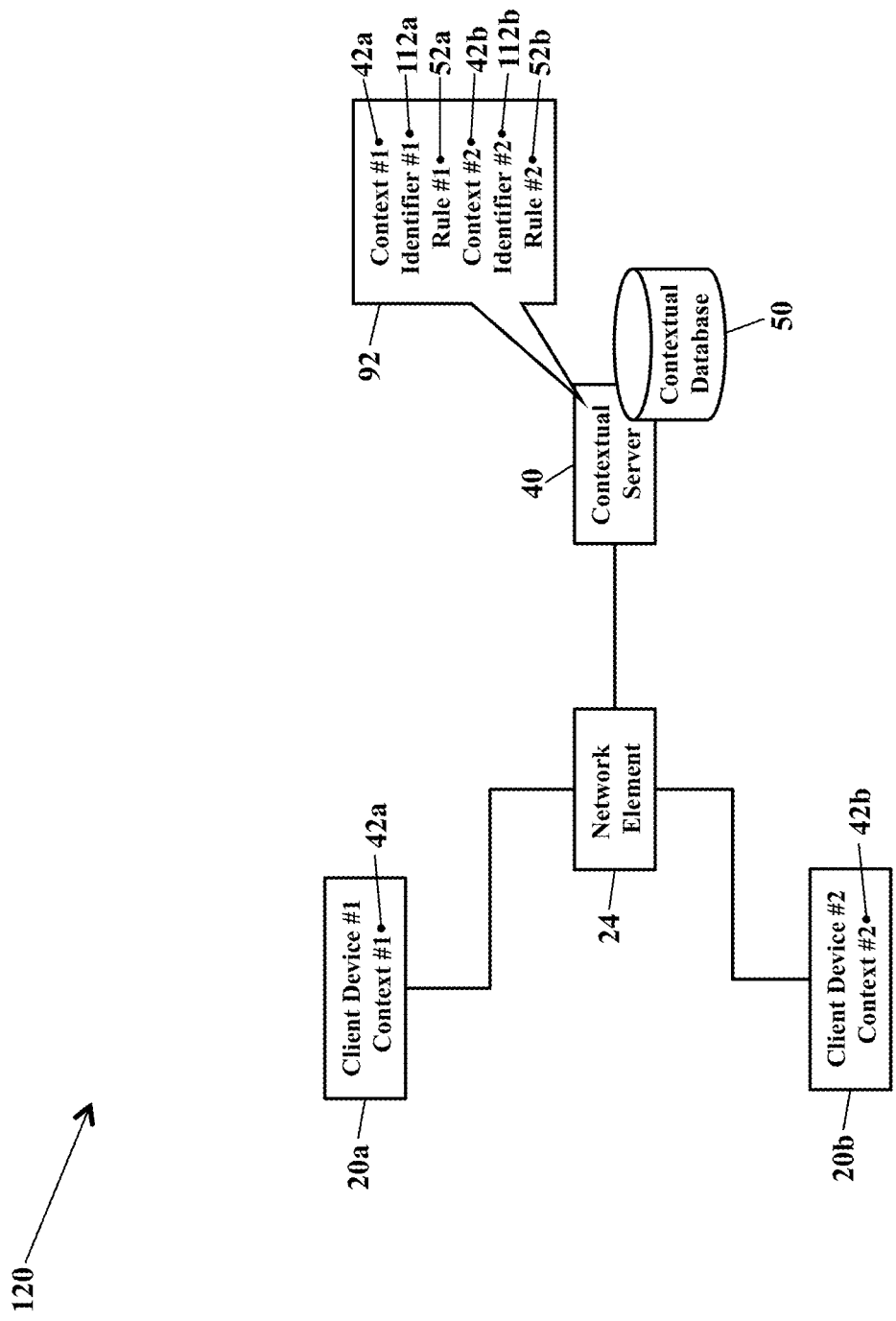

FIG. 12 further illustrates contextual management 120. Should either client device 20 desire contextual management 120, the contextual server 40 may be summoned for enforcement. The first client device 20a, for example, may be instructed to send its current context 42a to the network address of the network element 24, which may then be forwarded to the contextual server 40. The first client device 20a may, alternatively, simply be instructed to send its current context 42a directly to the network address of the contextual server 40. The second client device 20b may, likewise, be instructed to send its current context 42b.

Regardless, the contextual server 40 receives the respective device identifiers 112a and/or 112b, along with the current contexts 42a and 42b.

The contextual database 50 is consulted. The contextual server 40 queries the contextual database 50 for the device identifier 112a and the current context 42a of the first client device 20a. If the second client device 20b also requires contextual management 120, the contextual server 40 may also query for the device identifier 112b and the current context 42b of the second client device 20b. The contextual server 40 retrieves the corresponding contextual rules 52a and 52b.

Figure 13:
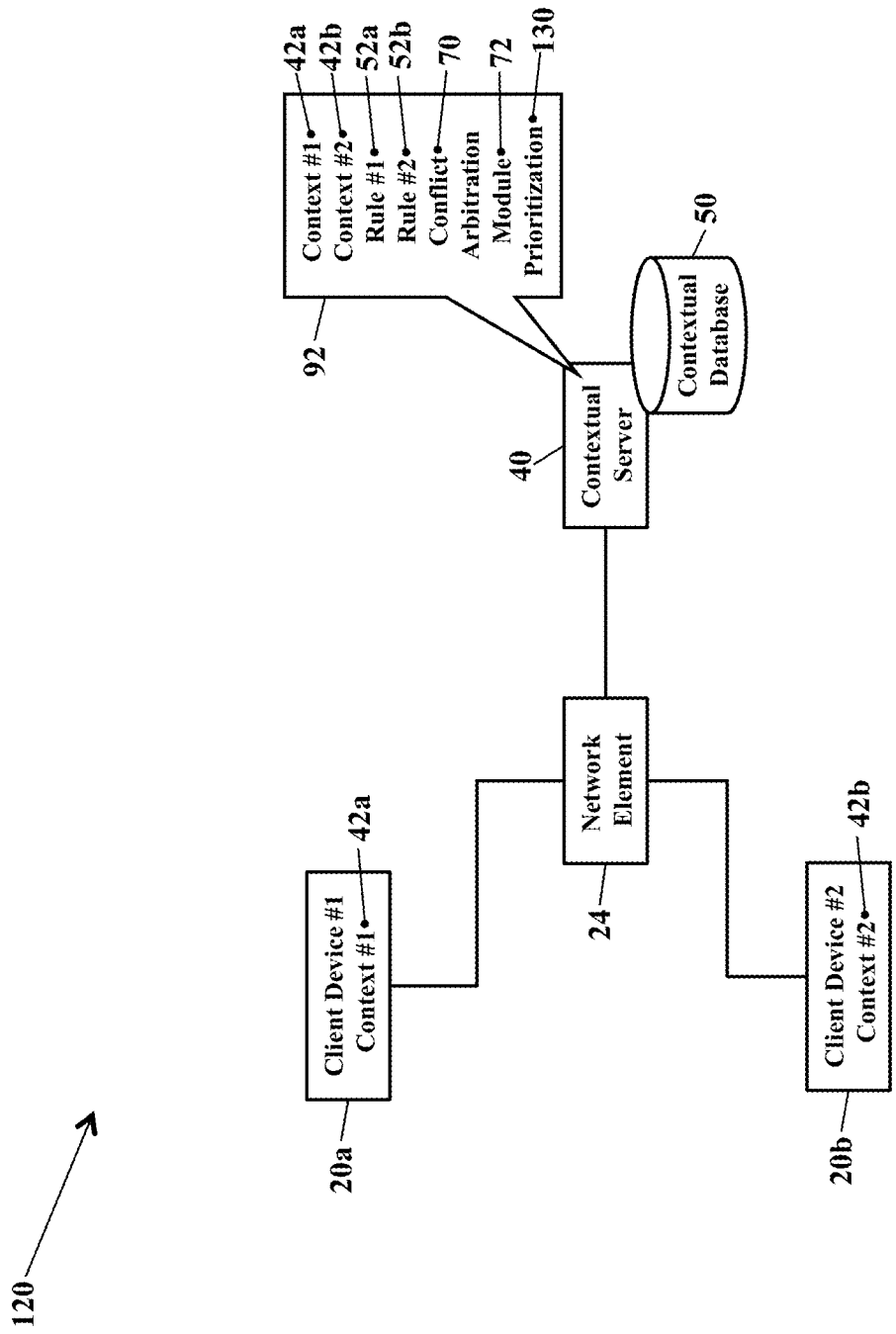

FIG. 13 illustrates centralized enforcement. Once the contextual server 40 retrieves the corresponding contextual rules 52a and 52b, here the contextual server 40 may enforce the respective user's contextual goals. That is, the contextual server 40 may compare the contextual rule 52a to the contextual rule 52b. If no conflict is determined, the contextual server 40 implements or authorizes execution of each respective contextual rules 52a and 52b. For example, the network element 24 and/or the client devices 20a and 20b are instructed to resume processing. Each user's respective contextual rules 52a and 52b are thus implemented to provide the desired contextual management 120.

Sometimes, though, the conflict 70 is determined. As the contextual server 40 compares the contextual rules 52a and 52b, some terms or fields may be mutually exclusive. The algorithm 92, then, may cause the contextual server 40 to determine the conflict 70. The algorithm 92 may then implement or call the arbitration module 72 to generate the resolution 74 of the conflict 70. The arbitration module 72, for example, may implement a policy, social goal, or any other scheme for resolving the conflict 70. The arbitration module 72 may thus be logical programming or rules that are chosen to resolve the conflict 70, based on some decision factor(s).

FIG. 13, for example, illustrates prioritization 130. As the competing rules 52a and 52b are compared, the prioritization 130 may be used to override, overrule, ignore, and/or disregard one of the contextual rules 52a or 52b. Indeed, should several client devices 20 wish to interact, exemplary embodiments may select a single one of the conflicting contextual rules 52 and disregard the remaining contextual rules. However the arbitration module 72 decides, the contextual server 40 implements or authorizes a selected one of the contextual rules 52 for execution.

Figure 14:
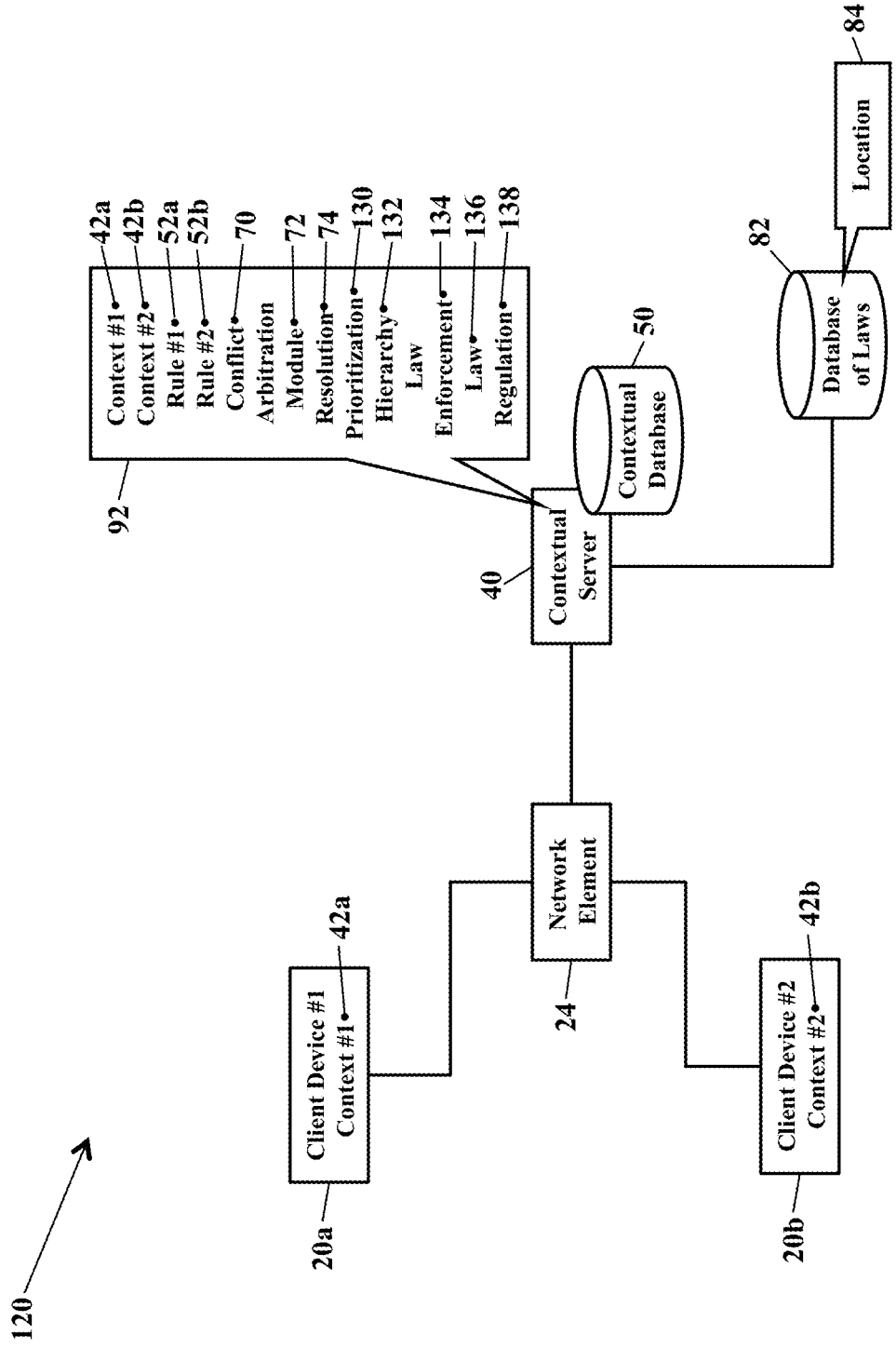

FIG. 14 further illustrates the prioritization 130. One such prioritization scheme may be based on social hierarchy 132. The President of the United States, as a simple example, may have priority over all other users. Should the contextual rules 52 of the President conflict with a different user's contextual rules 52, then contextual management 120 may always favor the President. This social hierarchy 132 may extend to any arrangement in which social and/or professional titles may be used to prioritize contextual management 120. The social hierarchy 132, as another simple example, may be tailored to hierarchical organizations where upper layers or levels of management may override lower layers or levels of employment. The contextual rules 52 related to law enforcement 134 may also override. Parents and children, spouses, and friends may also establish the prioritization 130. The prioritization 130, in simple words, may be based on any categorical or numerical description that may be compared and discerned.

As FIG. 14 further illustrates, laws 136 and regulations 138 may be used to resolve the conflict 70. Once the conflict 70 is determined, the contextual server 40 may query the database 82 of laws to generate the resolution 74 of the conflict 70. For example, if one of the contexts 42 indicates mobility at vehicle speeds, the contextual server 40 may retrieve local traffic laws for the corresponding location 84. Exemplary embodiments may thus prioritize or implement the contextual rule 52 for the moving client device 20. The conflicting contextual rule 52 of a different, stationary client device 20 may be disregarded in favor of traffic safety. Indeed, the traffic laws may greatly differ by state and country, so conflict resolution may favor the contextual rule 52 that avoids violations of local traffic laws. Citations for texting while driving, speeding, right turns on red, and other offenses may be reduced.

Updates and notifications may also be provided. As the reader may imagine, the laws 136 and regulations 138 may frequently change, especially on a geographic basis. Local and national governments often change their traffic regulations, building codes, and other ordinances. Roads are built to accommodate new growth, and older roads are repaired. The database 82 of laws thus contains dynamic information that often changes. So, at any time, exemplary embodiments may notify the client device 20 of database changes according to location. The database 82 of laws, for example, may push notifications to the client device 20, relaying changes in laws and policies to the client device 20.

Exemplary embodiments thus help resolve the conflict 70. Whenever two or more contextual rules 52a and 52b conflict, exemplary embodiments provide an arbitration mechanism. The resolution 74 may be based on one-time exceptions or long-term policies and social/behavioral goals. Whenever disparate Internet connected devices wish to interact, exemplary embodiments provide a centralized, contextual management solution in a shared ecosystem, based on user-defined rules. Exemplary embodiments may consult with local and national laws and regulations to ensure contextual decisions comport with up-to-date legal requirements.

Figure 15:
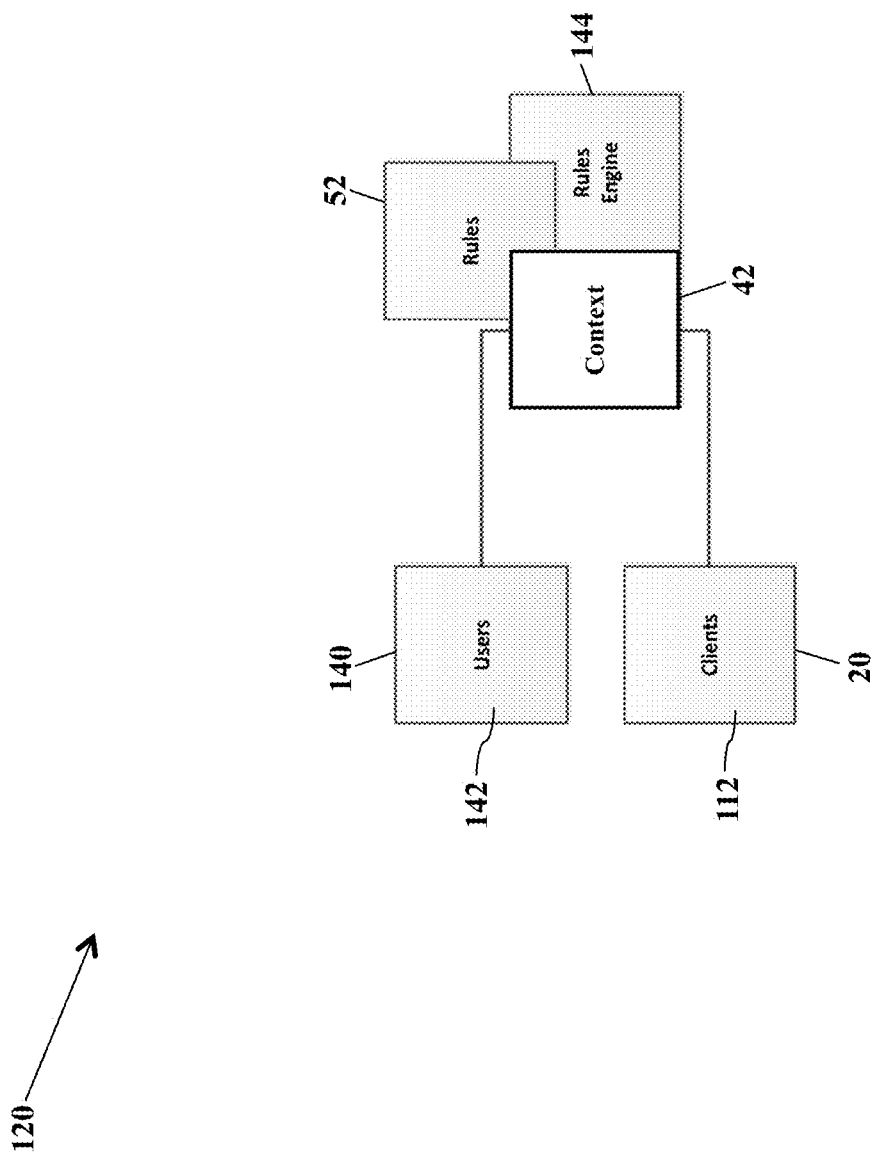
FIGS. 15-16 are conceptual illustrations of contextual management, according to exemplary embodiments.
Figure 16:
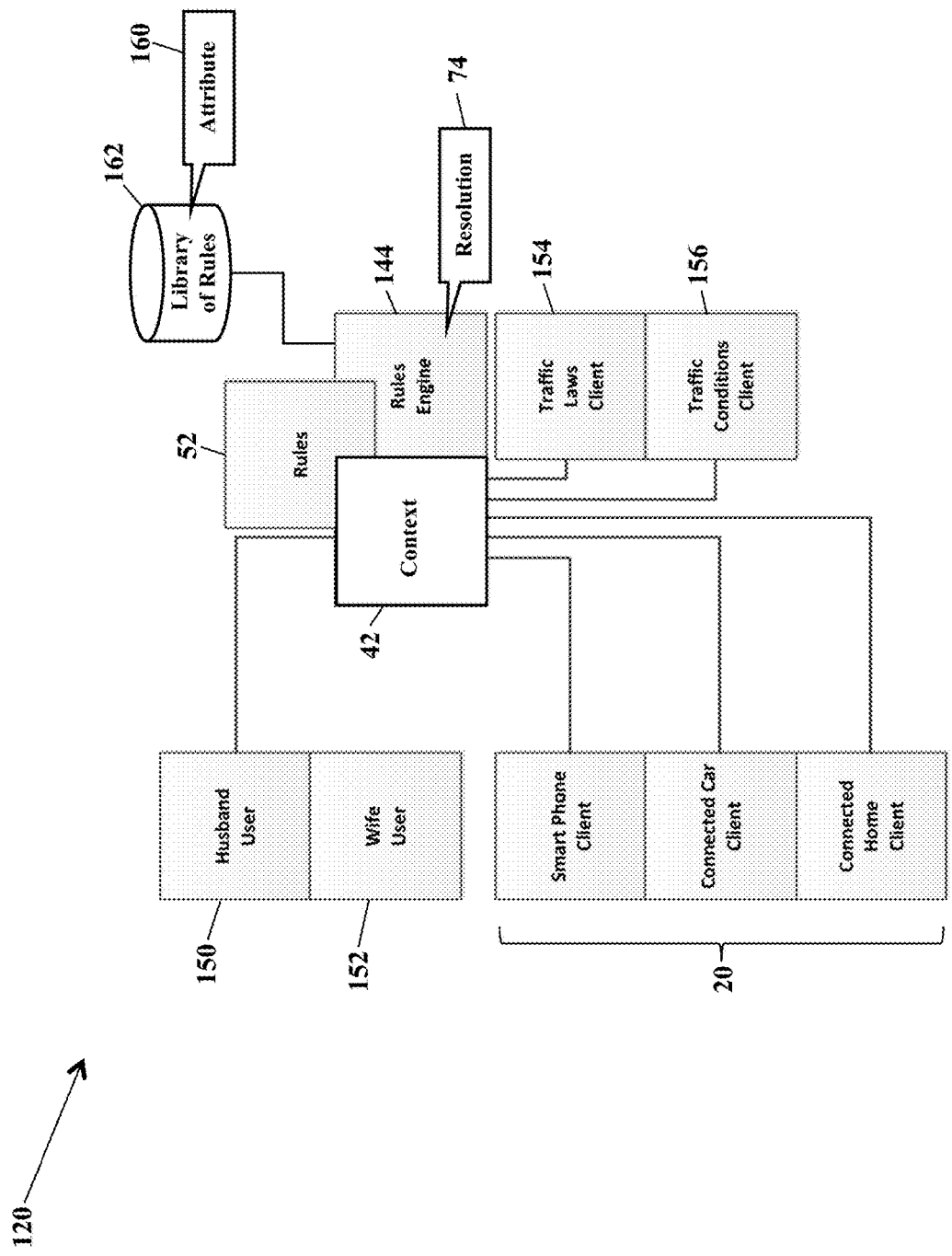

FIGS. 15-16 are conceptual illustrations of contextual management 120, according to exemplary embodiments. FIG. 15 illustrates that the contextual management 120 may be based on a particular user 140 and his/her client device 20. The user 140 may be uniquely identified by a user identifier 142 (such as username and password or other authentication credential). The client device 20 is uniquely identified by its device identifier 112 (as previously explained). The user identifier 142 and/or the device identifier 112 may thus be used to retrieve the corresponding contextual rules 52, depending on or based on the current context 42. A rules engine 144 (such as the contextual server 40, gateway 64, or any other processor-controlled device) evaluates and/or executes the contextual rules 52. FIG. 16 illustrates a specific conceptual example, in which Users #1 and #2 (illustrated, respectively, as husband 150 and spousal wife 152) define different contextual rules 52 for their usage of various client devices 20. As the rules engine 144 compares and weighs the different user's contextual rules 52, traffic laws 154 and traffic conditions 156 may be retrieved and used to determine the resolution 74.

Exemplary embodiments may be widely applied. Any user's contextual rules 52 may be centrally managed for their client devices 20, any software application, and any service. Application programming interfaces (APIs), for example, may be used to define common function and service calls for defining the features of contextual management 120. The client devices 20 may send and/or receive instructions to implement contextual management 120, as this disclosure explains. Each different user may register himself, and their client devices 20, perhaps using a user interface generated for display (such as by the display device 32 illustrated in FIG. 1). The husband 150 and wife 152 illustrated in FIG. 16 may thus register their connected home, connected car, smartphone 22, smart television, and any other individual or group of client devices 20. Each user may also register any software applications and services for which contextual management 120 is desired. Some users may have different roles and/or permissions, such as administrator or parent/child. Each user's different contextual rules 52 may thus be managed and governed to mediate the conflict 70.

The contextual rules 52 may be shared. As the reader may realize, each contextual rule 52 may require time and effort to correctly define. A full and rich definition, describing the many different contexts 42 of each client device 20, may thus require many hours of effort. Exemplary embodiments may thus permit the sharing or distribution of fully defined, or generic, contextual rules 52. Each contextual rule 52 may thus have an associated sharing attribute 160 that permits download to a different user's client device 20. Indeed, an entire library 162 of the contextual rules may be available for individual or group selection and download. Users may thus preview pre-created contextual rules 52 to reduce configuration time and effort.

Figure 17:
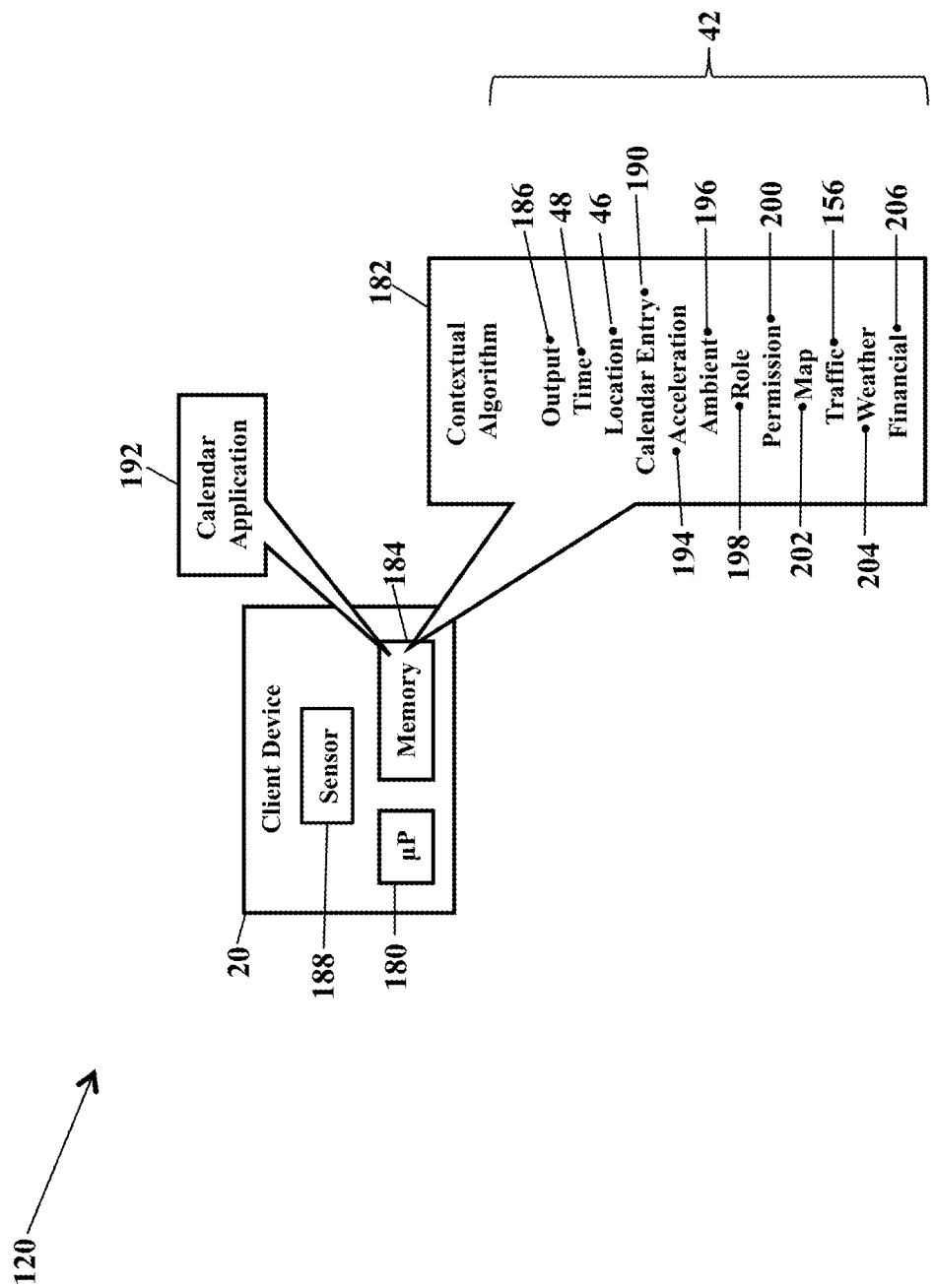
FIG. 17 is a more detailed schematic illustrating a client device, according to exemplary embodiments.

FIG. 17 is a more detailed schematic illustrating the client device 20, according to exemplary embodiments. The client device 20 may have a processor 180 that executes a contextual algorithm 182 stored in memory 184. The contextual algorithm 182 causes the client device 20 to determine its current context 42. Contextual determination is well known, so this disclosure need not provide a detailed explanation. Suffice it to say that the contextual algorithm 182 instructs the processor 180 to generate the context 42 from any information source. The processor 180, for example, may retrieve the sensory outputs 186 of various sensors 188. The client device 20, as a familiar example, may have GPS capability to determine the current time 48 of day and its current location 46. The client device 20, as another example, may also retrieve one or more entries 190 in the user's electronic calendar application 192. As another example, an accelerometer may provide measurements or signals representing acceleration 194. The location 46 may be alternatively determined from WI-FI® access points, network identifiers, and/or any known method. Other sensors may provide information indicating temperature, altitude, pressure, humidity, and any other ambient condition 196.

The context 42 may include other information. For example, the context 42 may be augmented by any role 198 or permission 200 for the corresponding user. Databases may be queried for geographical mapping 202, the traffic conditions 156 associated with the location 46, and any weather 204 associated with the location 46. Emergency information may also be retrieved for the location 46, plus demographic information associated with the user identifier and/or the location 46. Financial information 206 associated with the user identifier and/or the location 46 (such as stock prices and portfolio balances) may be retrieved. The context 42 may also be augmented with usage information describing any software applications executed by the client device 20.

Figure 18:
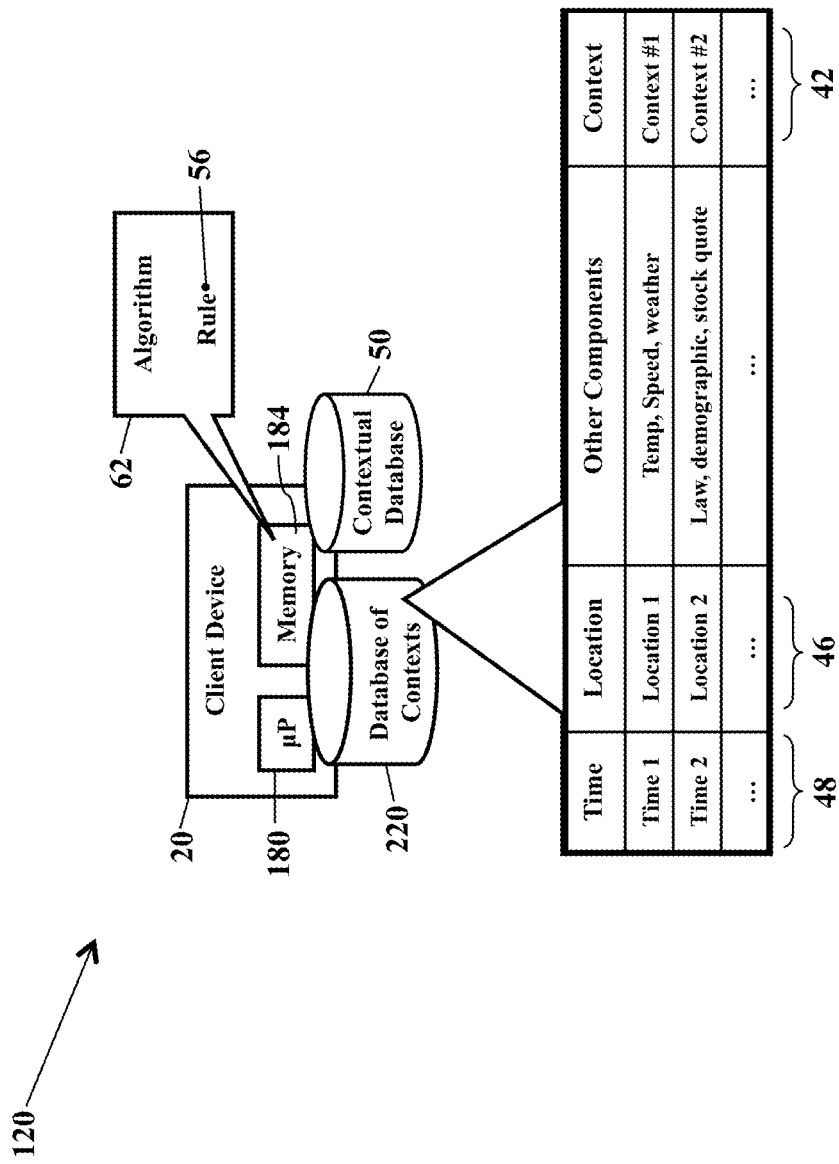
FIG. 18 is a schematic illustrating different categories of context, according to exemplary embodiments.

FIG. 18 is a schematic illustrating different categories of the context 42, according to exemplary embodiments. As the reader may realize, there may be many different combinations of information that define many different contexts 42. FIG. 18 thus illustrates a database 220 of contexts. The database 220 of contexts relates different contexts 42 to their constituent or component values, such as the time 48 and the location 46. FIG. 18, for simplicity, only illustrates entries for several common contexts 42. In practice, though, exemplary embodiments may determine many different contexts 42, depending on granularity and definition. Regardless, once the constituent or component values are retrieved (as explained with reference to FIG. 17), the database 220 of contexts is queried for the context 42. While FIG. 18 only illustrates a few contexts 42, in practice the database 220 of contexts likely contains a full and rich description, including hierarchically defined sub-tiers or levels. However the context 42 is determined, the contextual database 50 may then be consulted for the corresponding contextual rules 52, as this disclosure explains.

Contextual management 120 may be performed by any device. FIG. 18 illustrates the client device 20 characterizing its own context 42. Contextual management 120, however, may be performed by the contextual server and/or by the gateway (illustrated, respectively, as reference numerals 40 and 64 in this disclosure). Indeed, contextual management 120 may be performed by any processor-controlled device at any network location. Exemplary embodiments may simply query for any information desired to characterize the current context 42 of any client device 20. Contextual management 120 may thus be locally and/or remotely performed, depending on device capabilities (e.g., processor and memory) and network conditions (e.g., bandwidth and traffic).

Figure 19:
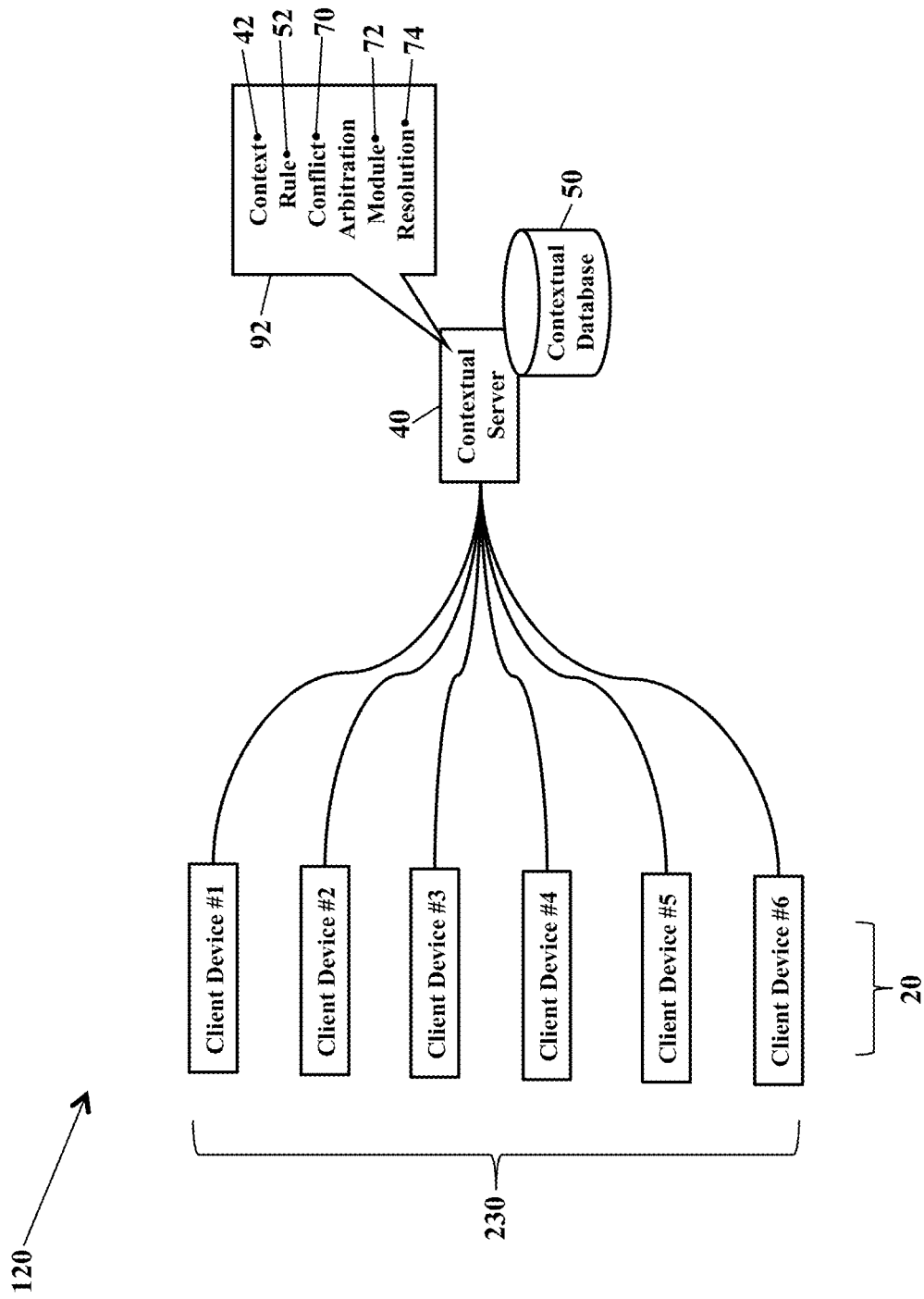
FIGS. 19-20 are schematics illustrating contextual management for a group of client devices, according to exemplary embodiments.
Figure 20:
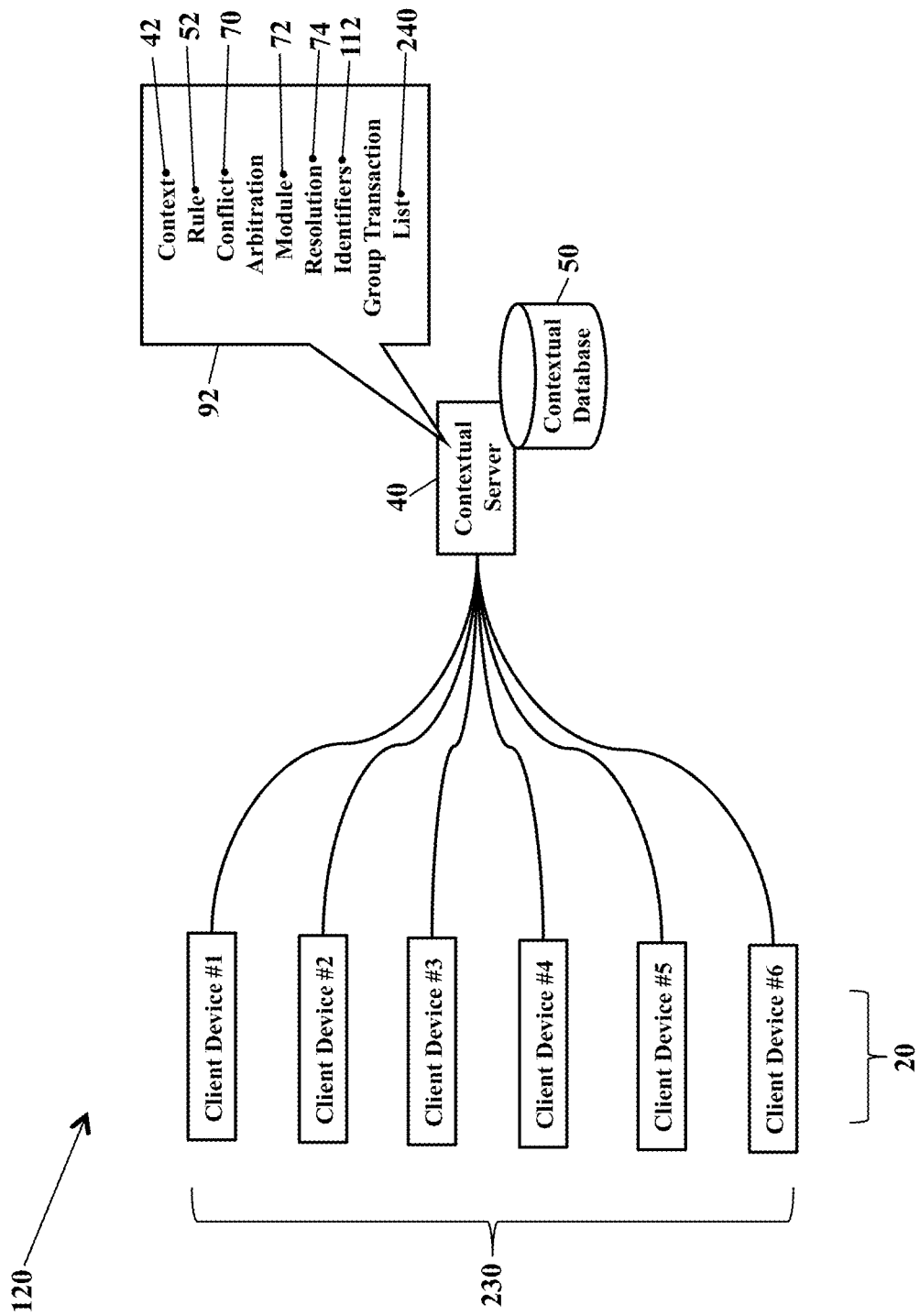

FIGS. 19-20 are schematics illustrating contextual management 120 for a group 230 of client devices 20, according to exemplary embodiments. Here exemplary embodiments may be extended to contextually manage many different client devices 20. While FIG. 19 only illustrates several client devices 20, contextual management 120 may be provided to hundreds or even thousands of client devices 20. Consider, for example, that one FACEBOOK® or TWITTER® user (at one of the client devices 20) commonly posts or tweets to a distribution list of hundreds of other users at their respective client devices 20. Exemplary embodiments, however, may evaluate the current context 42 of each member of the group 230 of client devices 20. The contextual server 40 may then retrieve the corresponding contextual rules 52. The contextual server 40 compares the contextual rules 52 for conflicting terms or outcomes. If no conflict is determined, the contextual server 40 implements or authorizes execution of each respective contextual rule 52. However, if the conflict 70 is determined, the contextual server 40 implements or calls the arbitration module 72 to generate the resolution 74, as this disclosure explains. Exemplary embodiments may thus be applied to any number of client devices 20 from any number of users.

FIG. 20 further illustrates group interaction. Here the contextual server 40 may receive the sender and receiver(s) for the group 230 of client devices 20. That is, whenever any one client device 20 attempts any transaction or message with one or more other client devices 20, all the device identifiers 112 in the transaction may be sent to or collected by the contextual server 40. Each member of the group 230 of client devices 20, in simple words, is individually identified to the contextual server 40. FIG. 20, for simplicity, illustrates the contextual server 40 receiving or generating a group transaction list 240. The group transaction list 240, for example, identifies the Internet Protocol network addresses associated with each sender and each recipient client device 20 in the group 230 of client devices 20. Once the contextual server 40 receives or generates the group transaction list 240, the contextual server 40 may generate or retrieve the current context 42 of each member in the group 230 of client devices 20. The contextual server 40, for example, may send a request for context to each network address, and each client device 20 responds with its current context 42. The contextual server 40 retrieves and compares the corresponding contextual rules 52 and generates the resolution 74 in response to any conflict 70, as this disclosure explains.

Figure 21:
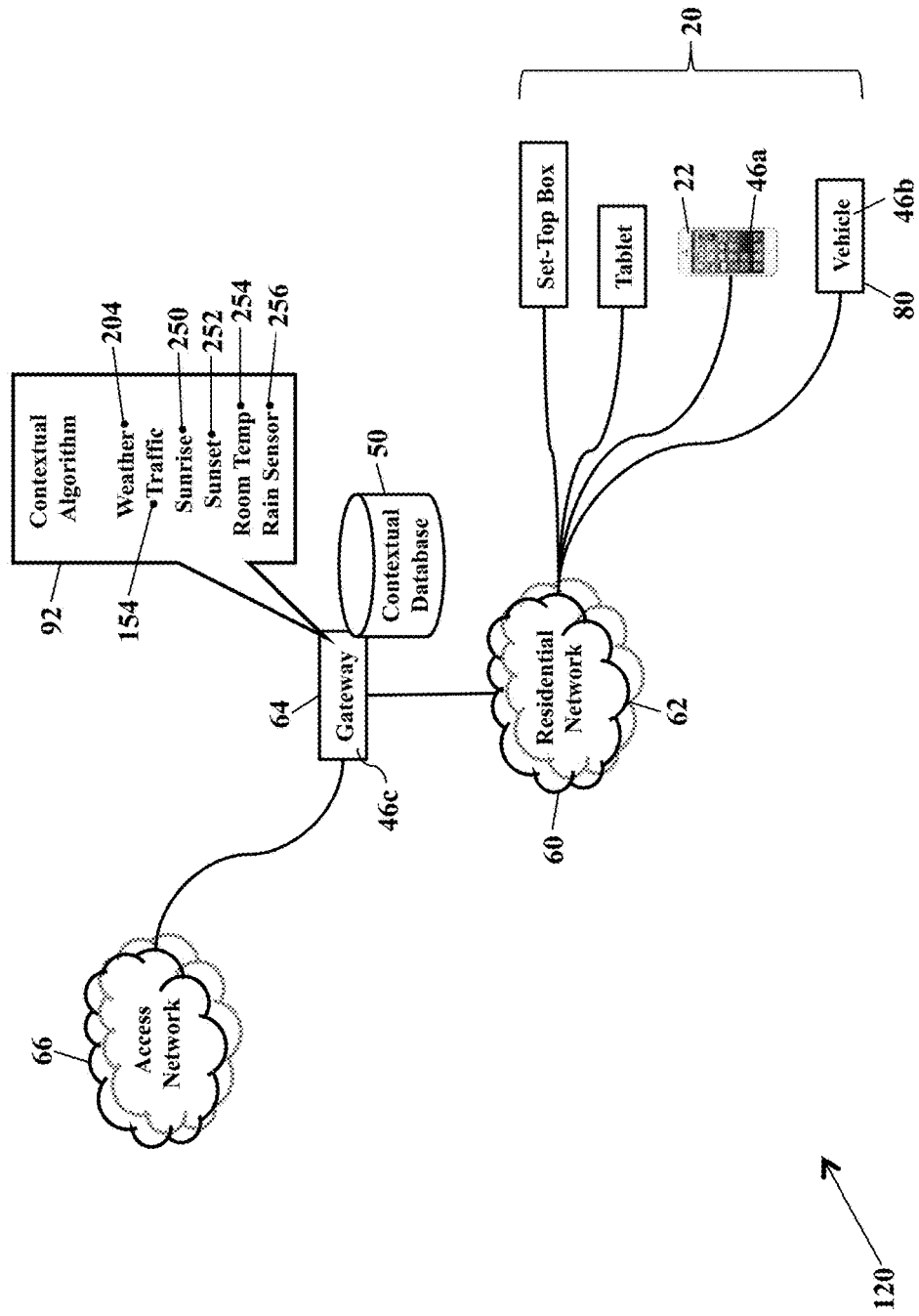
FIG. 21 illustrates another exemplary contextual management, according to exemplary embodiments.

FIG. 21 illustrates another exemplary contextual management 120, according to exemplary embodiments. Here a user's different client devices 20 may be contextually managed according to weather and traffic. As FIG. 21 illustrates, the home gateway 64 obtains the local weather data 204 and the local traffic conditions 154. The user's smartphone 22 and her vehicle 80 are also registered client devices 20. The gateway 64 may thus use the smartphone 22 and/or the access network 66 to retrieve a sunrise time 250 and a sunset time 252 for the current calendar day. The user's smartphone 22 provides its location 46a, and the vehicle 80 provides its current location 46b. The gateway 64 may also retrieve its location 46c, room temperature(s) 254, and an output of a rain sensor 256. The gateway 64 may thus retrieve various contextual rules 52, based on the various contexts 42. Some exemplary rules 52 may be:

- If the vehicle 80 is located within fifteen minutes of the home location 46c (according to the current traffic conditions 154), the gateway 64 may command an HVAC system to begin heating/cooling to a desired temperature.
- If the vehicle 80 is located within 300 feet of the home location 46c and the current time if later than the sunset time 252, the gateway 64 may activate outdoor lights.
- If a door sensor activates, the gateway 64 may activate interior lights after the sunset time 252.
- If the rain sensor 256 is negative (or "dry"), the gateway 64 may command a sprinkler system to activate and water a lawn; however, if the current location 46a of the smartphone 22 is within a predetermined radius (e.g., 5 FT), the gateway 64 may not command the sprinkler system to avoid soaking the user.

Other exemplary rules 52 are listed. For example, exemplary embodiments may disable the smartphone 22 from texting during school hours, but allow priority/emergency activities. Texting may also be disabled at locations matching religious organizations and/or during hours of religious services, excepting priority/emergency activities. Texting may also be disabled during homework hours, but again excepting priority/emergency activities. Receipt of objectionable content (such as R-rated TV shows and movies) may be blocked during predefined calendared events (such as dates, times, and locations from the electronic calendar in the mobile smartphone 22) of scheduled family reunions, meetings, and other calendar events. The contextual rules 52 may disable receipt of streaming movies and other content in response to a monthly maximum data usage. Content restrictions may further be based on the context 42, with different restrictions defined by work/business locations, time of day, and other contexts 42. Similarly, application access may be based on context 42, such as limited access to entertainment applications (NETFLIX®) and websites during "work" hours and locations and/or registration with a "work" network.

Still more exemplary rules 52 are described. Any of the client devices 20 may be configured with a do-not-disturb rule 52 that prevents rings, alerts, and other audible and visual notifications, except for friends, mom, and other designated addresses/numbers. If the location 46 of the client device 20 matches a theater, hospital, or other geographic location, audible and visual notifications may also be suppressed/silenced.

The context 42 and the rules 52 may also be based on historical usage. Once the contextual server 40 receives the sender's and the receiver's device identifiers 112, the algorithm 92 may also retrieve historical usage between the two identifiers 112. For example, the algorithm 92 may retrieve or determine an average response time between the sender's and the receiver's Internet Protocol addresses. That is, exemplary embodiments may consult a log of transactions that tracks historical transactions between the same Internet Protocol addresses. Over time an average response time may be determined, indicating a social importance between the Internet Protocol addresses. Good friends, as an example, are likely to quickly respond to texts, emails, and other interactions. The dutiful son or daughter likely quickly responds to mom's messages. More distant friendships and relations likely have slower/longer average response times. Social importance may thus be inferred from the average response time between two device identifiers 112. Any do-not-disturb rule 52 may thus be suspended, based on the social importance inferred from the average response time. Should the conflict 70 be determined, the resolution 74 may be based on the social importance inferred from the average response time. The receiver's rule 52, as an example, may be preferred when the receiver's average response time is short (e.g., within 10 minutes or less).

Figure 22:
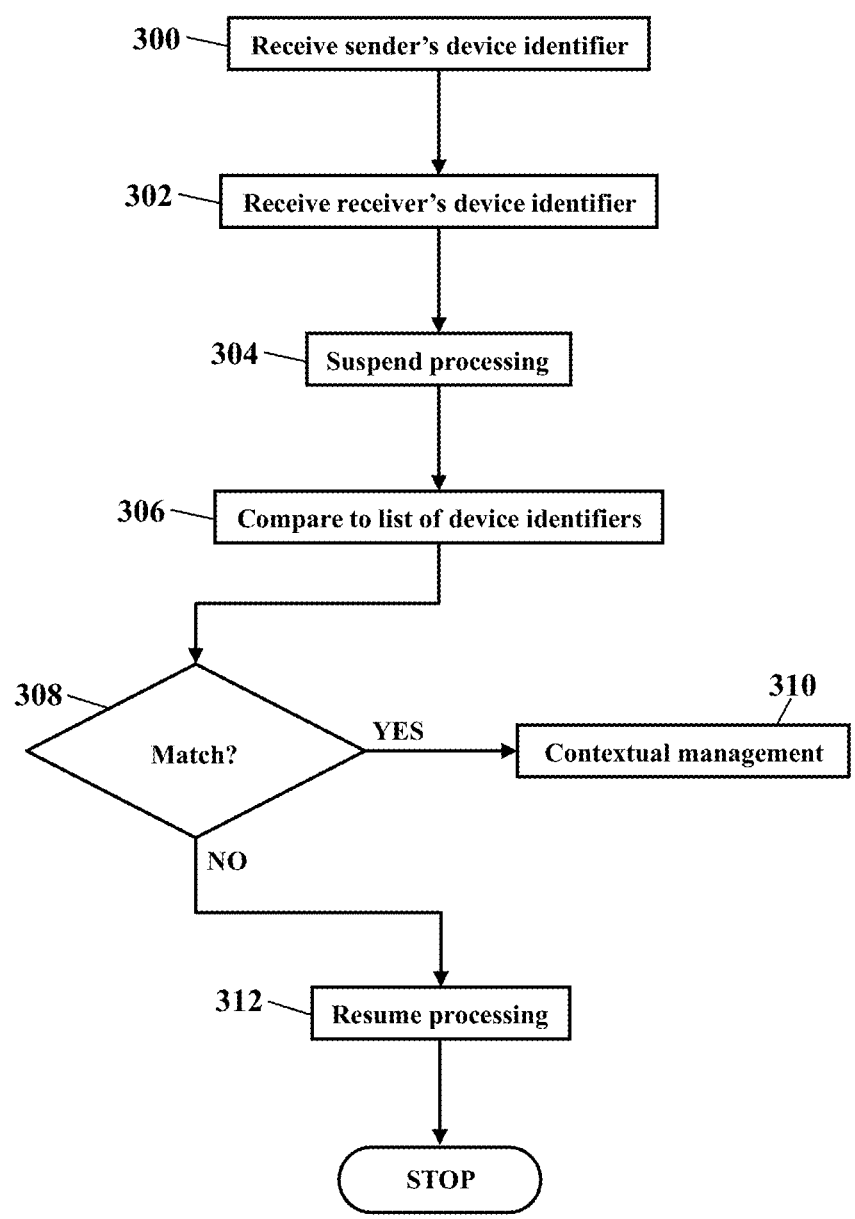
FIGS. 22-23 are flowcharts illustrating the contextual management, according to exemplary embodiments.
Figure 23:
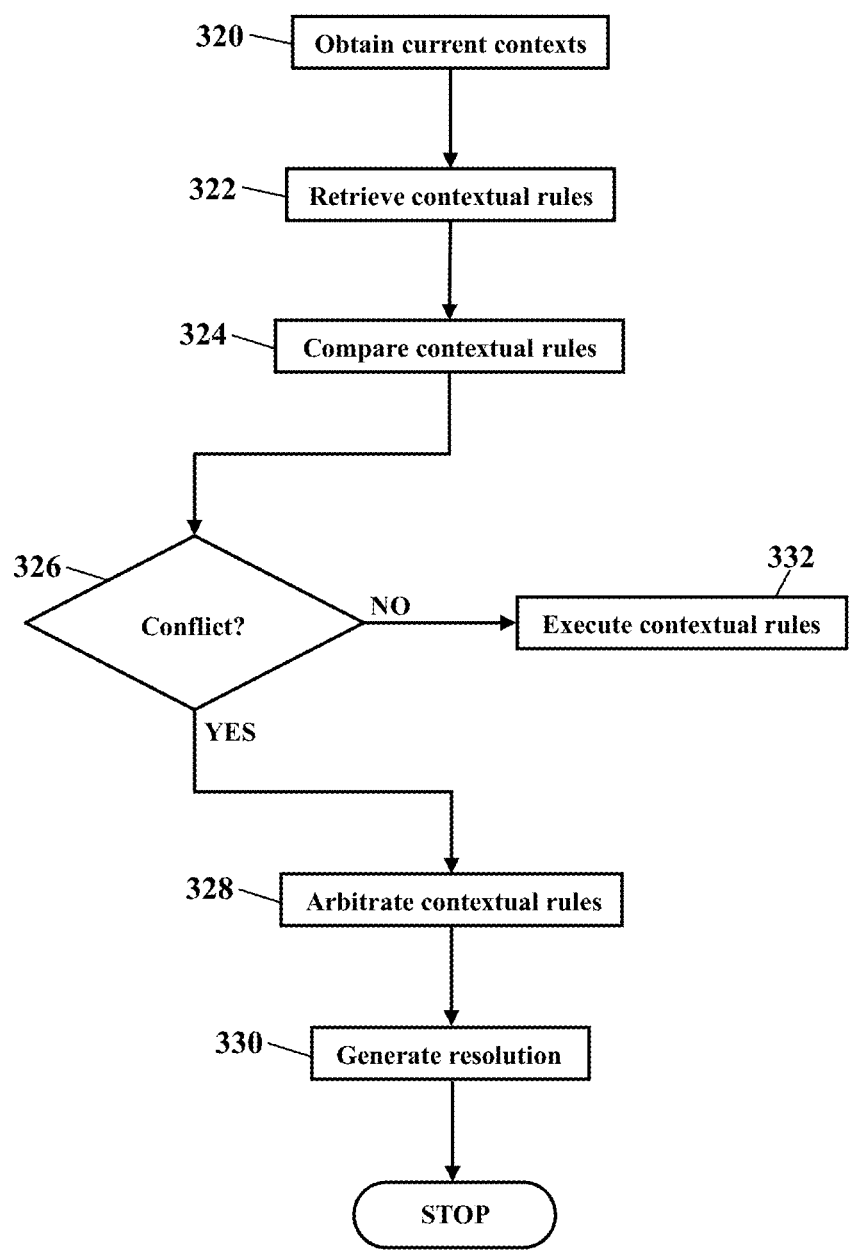

FIGS. 22-23 are flowcharts illustrating the contextual management 120, according to exemplary embodiments. An origination or sender's device identifier 112 (Block 300) and a destination or receiver's device identifier 112 (Block 302) are received. Processing suspends (Block 304) while the device identifiers 112 are compared to the list 124 of device identifiers (Block 306). If a match is determined (Block 308), operations for the contextual management 120 are performed (Block 310). If no match is determined (Block 308), conventional processing is resumed (Block 312).

FIG. 23 further illustrates the contextual management 120. The current context 42, associated with each device identifier 112, is obtained (Block 320) by generation or retrieval. The corresponding contextual rule(s) 52 are retrieved (Block 322) and compared (Block 324). If the conflict 70 is determined (Block 326), the contextual rule(s) 52 are arbitrated (Block 328) to generate the resolution 74 (Block 330). If no conflict exists (Block 326), the contextual rule(s) 52 are individually executed (Block 332).

Figure 24:
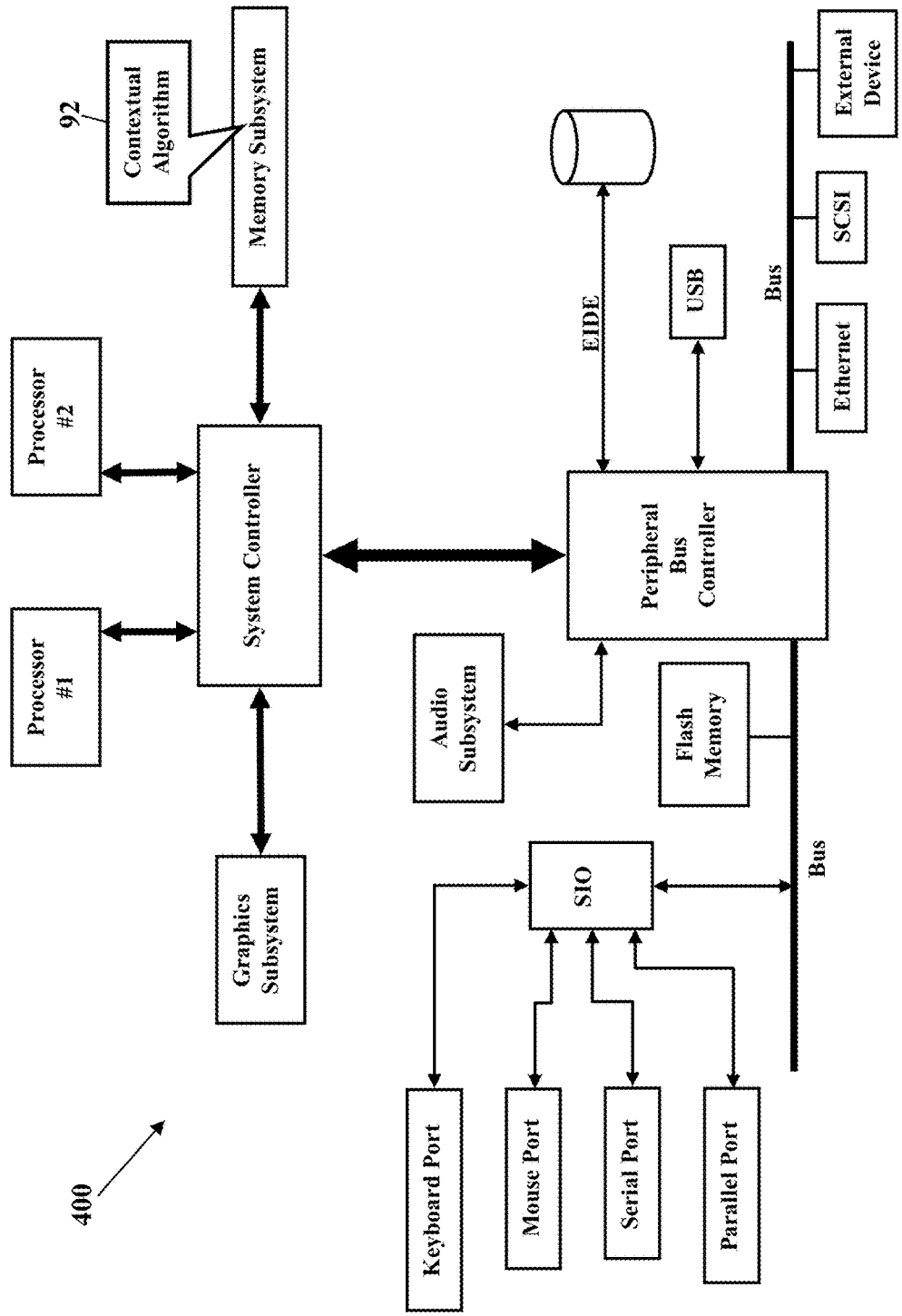
FIGS. 24-25 depict still more operating environments for additional aspects of the exemplary embodiments.

FIG. 24 is a schematic illustrating still more exemplary embodiments. FIG. 24 is a more detailed diagram illustrating a processor-controlled device 400. As earlier paragraphs explained, the algorithm 92 may operate in any mobile or stationary processor-controlled device. FIG. 24, then, illustrates the algorithm 92 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 25:
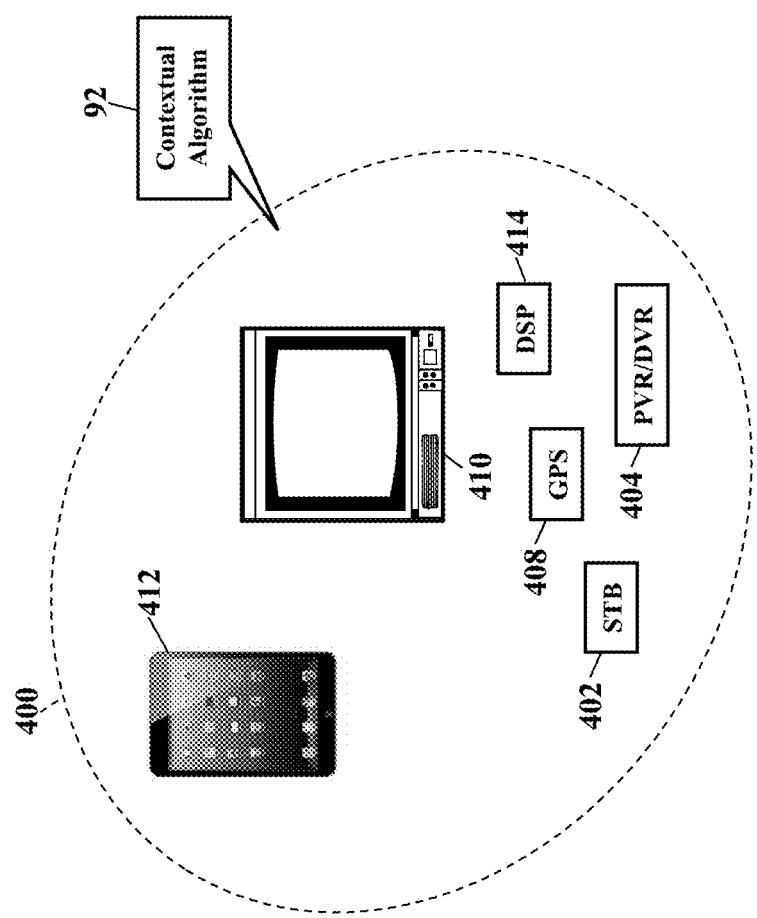

FIG. 25 depicts other possible operating environments for additional aspects of the exemplary embodiments. FIG. 25 illustrates the algorithm 92 operating within various other processor-controlled devices 400. FIG. 25, for example, illustrates that the algorithm 92 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for contextual management, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system comprising:
a processor; and
a memory that stores instructions that, when executed by the processor, cause the processor to perform operations comprising:
obtaining, by a gateway device located at a first location, information that indicates the first location;
obtaining, by the gateway device and from a first client device that communicates with the gateway device, a first context associated with the first client device, wherein the first context comprises a second location at which the first client device is located;
obtaining, by the gateway device and from a second client device that communicates with the gateway device, a second context associated with the second client device, wherein the second context comprises a third location at which the second client device is located and a current time;
accessing, by the gateway device, a contextual database that maps contexts to rules;
querying, by the gateway device, the contextual database for a first rule that maps to the first context and a second rule that maps to the second context;
obtaining, by the gateway device and in response to the querying, the first rule and the second rule;
determining, by the gateway device and based on the first rule, that the first rule applies based on a distance between the first location and the second location;
determining, by the gateway device and based on the second rule, that the second rule applies based on the current time;
determining, by the gateway device and based on the first rule, a first change to be made at the first location;
determining, by the gateway device and based on the second rule, a second change to be made at the first location;
determining, by the gateway device, that a conflict exists between the first change and the second change;
determining, by the gateway device, a resolution of the conflict between the first change and the second change to determine a change to be made at the first location; and
activating, by the gateway device, a device located at the third location, wherein the device is activated to cause the change to be made at the first location.

2. The system of claim 1, wherein the gateway device obtains a temperature at the first location, wherein the device at the first location comprises a heating, ventilation, and air conditioning system, and wherein the change to be made comprises changing the temperature at the first location by activating the heating, ventilation, and air conditioning system.

3. The system of claim 1, wherein the device at the first location comprises a lighting device at the first location, and wherein the change to be made comprises activating the lighting device.

4. The system of claim 1, wherein determining the resolution comprises:
determining, based on a prioritization associated with the first client device and the second client device, an identity of a client device that is to be prioritized and a rule associated with the device; and
determining, based on the identity of the client device, the change to be made.

5. The system of claim 1, wherein determining the resolution comprises:
in response to determining that an emergency condition exists, assigning priority to the first client device and defining the change as the first change.

6. The system of claim 1, wherein determining the resolution comprises:
determining, based on an identity of a user associated with the first client device, that the first client device is to be prioritized over the second client device; and
defining the change to be made as the first change in response to determining that the first client device is to be prioritized over the second client device.

7. A method comprising:
obtaining, by a gateway device located at a first location, information that indicates the first location;
obtaining, by the gateway device and from a first client device that communicates with the gateway device, a first context associated with the first client device, wherein the first context comprises a second location at which the first client device is located;
obtaining, by the gateway device and from a second client device that communicates with the gateway device, a second context associated with the second client device, wherein the second context comprises a third location at which the second client device is located and a current time;
accessing, by the gateway device, a contextual database that maps contexts to rules;
querying, by the gateway device, the contextual database for a first rule that maps to the first context and a second rule that maps to the second context;
obtaining, by the gateway device and in response to the querying, the first rule and the second rule;
determining, by the gateway device and based on the first rule, that the first rule applies based on a distance between the first location and the second location;
determining, by the gateway device and based on the second rule, that the second rule applies based on the current time;

determining, by the gateway device and based on the first rule, a first change to be made at the first location;

determining, by the gateway device and based on the second rule, a second change to be made at the first location;

determining, by the gateway device, that a conflict exists between the first change and the second change;

determining, by the gateway device, a resolution of the conflict between the first change and the second change to determine a change to be made at the first location; and activating, by the gateway device, a device located at the first location, wherein the device is activated to cause the change to be made at the first location.

8. The method of claim 7, wherein the gateway device obtains a temperature at the first location, wherein the device at the first location comprises a heating, ventilation, and air conditioning system, and wherein the change to be made comprises changing the temperature at the first location by activating the heating, ventilation, and air conditioning system.

9. The method of claim 7, wherein the device at the first location comprises a lighting device at the first location, and wherein the change to be made comprises activating the lighting device at the third location.

10. The method of claim 7, wherein determining the resolution comprises:

determining, based on a prioritization associated with the first client device and the second client device, an identity of a client device that is to be prioritized and a rule associated with the device; and determining, based on the identity of the client device, the change to be made.

11. The method of claim 7, wherein determining the resolution comprises:

in response to determining that an emergency condition exists, assigning priority to the first client device and defining the change as the first change.

12. The method of claim 7, wherein determining the resolution comprises:

determining, based on an identity of a user associated with the first client device, that the first client device is to be prioritized over the second client device; and defining the change to be made as the first change in response to determining that the first client device is to be prioritized over the second client device.

13. A memory storing instructions that, when executed by a processor, cause the processor to perform operations comprising:

obtaining, by a gateway device located at a first location, information that indicates the first location;

obtaining, by the gateway device and from a first client device that communicates with the gateway device, a first context associated with the first client device, wherein the first context comprises a second location at which the first client device is located;

obtaining, by the gateway device and from a second client device that communicates with the gateway device, a second context associated with the second client device, wherein the second context comprises a third location at which the second client device is located and a current time;

accessing, by the gateway device, a contextual database that maps contexts to rules;

querying, by the gateway device, the contextual database for a first rule that maps to the first context and a second rule that maps to the second context;

obtaining, by the gateway device and in response to the querying, the first rule and the second rule;

determining, by the gateway device and based on the first rule, that the first rule applies based on a distance between the first location and the second location;

determining, by the gateway device and based on the second rule, that the second rule applies based on the current time;

determining, by the gateway device and based on the first rule, a first change to be made at the first location;

determining, by the gateway device and based on the second rule, a second change to be made at the first location;

determining, by the gateway device, that a conflict exists between the first change and the second change;

determining, by the gateway device, a resolution of the conflict between the first change and the second change to determine a change to be made at the first location; and activating, by the gateway device, a device located at the third location, wherein the device is activated to cause the change to be made at the first location.

14. The memory of claim 13, wherein the gateway device obtains a temperature at the first location, wherein the device at the first location comprises a heating, ventilation, and air conditioning system, and wherein the change to be made comprises changing the temperature at the first location by activating the heating, ventilation, and air conditioning system.

15. The memory of claim 13, wherein the wherein the device at the first location comprises a lighting device at the first location, and wherein the change to be made comprises activating the lighting device at the third location.

16. The memory of claim 13, wherein determining the resolution comprises:

determining, based on a prioritization associated with the first client device and the second client device, an identity of a client device that is to be prioritized and a rule associated with the device; and determining, based on the identity of the client device, the change to be made.

17. The memory of claim 13, wherein determining the resolution comprises:

in response to determining that an emergency condition exists, assigning priority to the first client device and defining the change as the first change.

18. The memory of claim 13, wherein determining the resolution comprises:

determining, based on an identity of a user associated with the first client device, that the first client device is to be prioritized over the second client device; and defining the change to be made as the first change in response to determining that the first client device is to be prioritized over the second client device.

* * * * *